United States Patent [19]

Schmidt et al.

[11] Patent Number: 4,558,413

[45] Date of Patent: Dec. 10, 1985

[54] SOFTWARE VERSION MANAGEMENT SYSTEM

[75] Inventors: Eric E. Schmidt, Los Altos, Calif.; Butler W. Lampson, Philadelphia, Pa.

[73] Assignee: Xerox Corporation, Stamford, Conn.

[21] Appl. No.: 553,724

[22] Filed: Nov. 21, 1983

[51] Int. Cl.$^4$ .............................................. G06F 15/20
[52] U.S. Cl. .................................... 364/300; 364/200
[58] Field of Search ......................................... 364/300

[56] References Cited

U.S. PATENT DOCUMENTS 4,309,756  1/1982  Beckler ............................... 364/300

OTHER PUBLICATIONS

Morse et al., DOS/AMAP Model of the DOS Control Program, *I.B.M. Technical Disclosure Bulletin*, vol. 14, No. 3, Aug. 1971, pp. 852–853.
Alan L. Glasser, "The Evolution of a Source Code Control System", Proc. Software Quality and Assurance Workshop, Software Engineering Notes, vol. 3, No. 5 pp. 122–125, Nov. 1978.
Ira P. Goldstein & Daniel G. Bobrow, "Representing Design Alternatives", Proceedings of the Artificial Intelligence and Simulation of Behavior Conference, Amsterdam, Jul. 1980.
A. Nico Habermann, Robert Ellison, Raul Medina-Mora, Peter Feiler, David S. Notkin, Gail E. Kaiser, David B. Garlan & Steven Popovich, "The Second Compendium of Gandall Documentation" CMU Department of Computer Science, May 24, 1982.
Gail E. Kaiser & A. Nico Habermann, "An Environment for System Version Control" in The Second Compendium of Gandalf Documentation, CMU Department of Computer Science, Feb. 4, 1982.
B. W. Lampson et al., "Practical Use of a Polymorhic Applicative Language", Proceedings of the 10th Symposium on Principles of Programming Languages, Austin, Texas, Jan. 1983.
W. F. Tichy, "Design Implementation and Evaluation of a Revision Control System", Proceedings of the 6th International Conference on Software Engineering, Tokyo, Japan, Sep. 1982.

Dissertation of Eric Emerson Schmidt, entitled "Controlling Large Software Development in a Distributed Environment", approved Nov. 1982.
Xerox Palo Alto Research Centers Publication, CSL-8-2-7, dated Dec. 1982, "Controlling Large . . . Environment", Schmidt.
Ira P. Goldstein & Daniel G. Bobrow, "A Layered Approach to Software Design," Xerox Parc. Tech. Report, CSL-80-5, Dec. 1980.
James G. Mitchell et al., "Mesa Language Manual, Version 5.0" Xerox Parc. Tech. Report, CSL-79-3, Apr. 1979.

(List continued on next page.)

*Primary Examiner*—Raulfe B. Zache
*Attorney, Agent, or Firm*—W. Douglas Carothers, Jr.

[57] ABSTRACT

A software version management system, also called system modeller, provides for automatically collecting and recompiling updated versions of component software objects comprising a software program for operation on a plurality of personal computers coupled together in a distributed software environment via a local area network. The component software objects include the source and binary files for the software program, which stored in various different local and remote storage means through the environment. The component software objects are periodically updated, via a system editor, by various users at their personal computers and then stored in designated storage means. The management system includes models which are also objects. Each of the models is representative of the source versions of a particular component software object and contain object pointers including a unique name of the object, a unique identifier descriptive of the cronological updating of its current version, information as to an object's dependencies on other objects and a pathname representative of the residence storage means of the object. Means are provided in the system editor to notify the management system when any one of the objects is being edited by a user and the management system is responsive to such notification to track the edited objects and alter their respective models to the current version thereof.

6 Claims, 29 Drawing Figures

OTHER PUBLICATIONS

A. Nico Habermann, "Tools for Software System Construction", Proceedings of the Software Tools Workshop, Boulder, Colorado, May 1979.

Arra Avakian, Sam Haradhvala, Julian Horn & Bruce Knobe, "The Design of an Integrated Support Software System", Proceedings of the SIGPLAN '82 Symposium on Compiler Construction, pp. 308–317, Jun. 23–25, 1982.

Lee W. Cooprider, The Representation of Families of Software Systems, Ph.D Thesis, CMU Computer Science Department, CMU-CS-79-116, Apr. 14, 1979.

Eugene Cristofor, T. A. Wendt & B. C. Wonsiewicz, "Source Control+Tools=Stable Systems", Proceedings of the Fourth Computer Software and Applications Conference, pp. 527–532, Oct. 29–31, 1980.

A. Demers & J. Dononhue, "Data Types, Parameters, and Type Checking", Proceedings of the Seventh Symposium on Principles of Programming Languages, Las Vegas, Nevada, pp. 12–23, 1980.

Frank DeRemer & H. Kron, "Programming-in-the-Large Versus Programming-in-the-Small", IEEE Transactions on Software Engineering, vol. 2, No. 2, pp. 80–86, Jun. 1976.

Stuart I. Feldman, "Make-A Program for Maintaining Computer Programs", Software Practice and Experience, vol. 9, No. 4, pp. 255–256, Apr. 1979.

Ira P. Goldstein & Daniel G. Bobrow, "Descriptions for a Programming Environment", Proceedings of the First Annual Conference of the National Association of Artificial Intelligence, Stanford, California, Aug. 1980.

Eric Harslem and LeRoy E. Nelson, "A Retrospective on the Development of Star", Proceedings of the 6th International Conference on Software Engineering, Tokyo, Japan, Sep. 1982.

Thomas R. Horsley & William C. Lynch, "Pilot: A Software Engineering Case Study", Proceedings of the 4th International Conference on Software Engineering, pp. 94–99, 1979.

Evan L. Ivie, "The Programmer's Workbench-A Machine for Software Development", Communications of the ACM, vol. 20, No. 10, pp. 746–753, Oct. 1977.

Hugh C. Lauer & Edwin H. Satterthwaite, "The Impact of Mesa on System Design", Proceedings of the 4th International Conference on Software Engineering, pp. 174–182, 1979.

D. Redell, Y. Dalal, T. Horsley, H. Lauer, W. Lynch, P. McJones, H. Murray & S. Purcell, "Pilot: An Operating System for a Personal Computer", Proceedings of the Seventh Symposium on Operating System Principles, Dec. 1979.

Marc J. Rochkind, "The Source Code Control System", IEEE Transactions on Software Engineering, vol. 1, No. 4, pp. 364–370, Dec. 1975.

Walter F. Tichy, Software Development Control Based on System Structure Description, PH.D., Thesis, CMU Computer Science Department, CMU-CS-80-120, Jan. 1980.

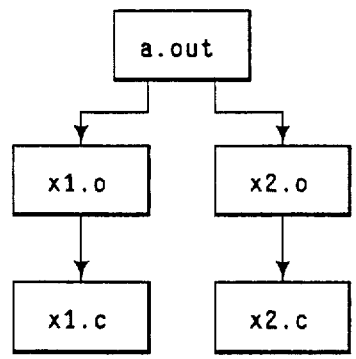
PRIOR ART  FIG. 1
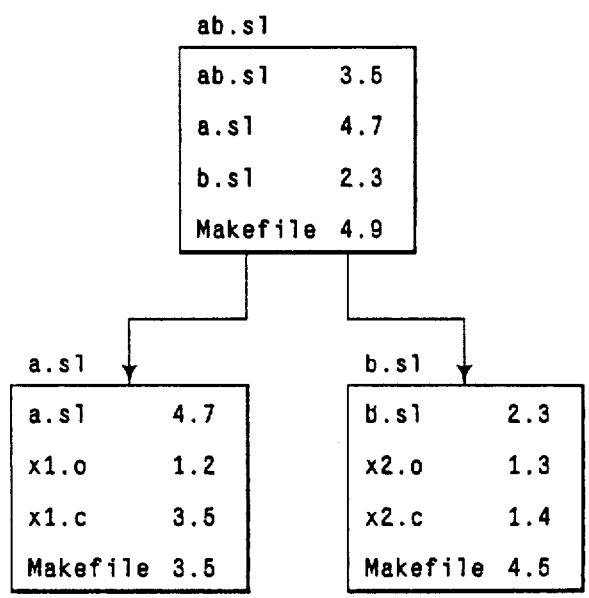
PRIOR ART
FIG. 2

```
SortImpl.Mesa

DIRECTORY
   Sort;
SortImpl:PROGRAM EXPORTS Sort={
   USortList:PROC[I:LIST OF Object,
      compareProc: CompareProc]
      RETURNS[newI:LIST OF Object]={
      --code to sort the list I,
      eliminating duplicates
      };
   };
```

TO FIG. 13A

SortCoord.Mesa

```
Sort:DEFINITIONS={
Object:TYPE=RECORD[
  x,y:INT
  ];
USortList:PROC[LIST OF Object, CompareProc]
  RETURNS[LIST OF Object];
}.
```

SortNames.Mesa

```
Sort:DEFINITIONS={
Object:TYPE=RECORD[
  x:STRING
  ];
USortList:PROC[LIST OF Object, CompareProc]
  RETURNS[LIST OF Object];
}.
```

*FIG. 14*

SortQuickImpl.Mesa

```
DIRECTORY
   Sort;
SortQuickImpl:PROGRAM EXPORTS Sort={
   USortList:PUBLIC PROC[I:LIST OF Object,
      compareProc:CompareProc]
      RETURNS[newI:LIST OF Object]={
      --code to sort the list I, eliminating duplicates
      --use QuickSort
      };
   }.
```

SortHeapImpl.Mesa

```
DIRECTORY
   Sort;
SortHeapImpl:PROGRAM EXPORTS Sort={
   USortList:PUBLIC PROC[I:LIST OF Object,
      compareProc:CompareProc]
      RETURNS[newI:LIST OF Object]={
      --code to sort the list I, eliminating duplicates
      --use HeapSort
      };
   }.
```

*FIG. 15A*

ClientImpl.Mesa

```
DIRECTORY
Sort;
ClientImpl:IMPORTS SortQuickInst:Sort.SortHeapInst:Sort=
  TestThem:PROC[I:LIST OF Object]={
    --call USortList with this list, try QuickSort
    newI←SortQuickInst.USortList[I.CompareObject];
    ---now try HeapSort
    newI←SortHeapInst.USortList[I.CompareObject]:
    ...
    };
  CompareObject:PROC[a,b:Object]
    RETURNS[Comparison]={
    --compares the two objects
    --returns less, equal, or greater
    };
  }.
```

*FIG. 15B*

```
ClientImpl.Mesa
```

```
DIRECTORY

SortCoord:INTERFACE Sort,

SortNames:INTERFACE Sort;

ClientImpl:PROGRAM IMPORTS SortQuickCoordInst:SortCoord,

SortQuickNamesInst:SortNames,SortHeapCoordInst:SortCoord,

SortHeapNamesInst={

TestThem:PROC[I1:LIST OF SortCoord.Object,I2:LIST OF SortNames.Object]={ newI←SortQuickCoordInst.USortList[I1, CompareCoordinateObjects];

newI←SortHeapCoordInst.USortList[I1, CompareCoordinateObjects];

newI←SortQuickNamesInst.USortList[I2, CompareNameObjects], newI←SortHeapNamesInst.USortList[I2, CompareNamesObjects];

};

CompareCoordinateObjects:PROC[a,b:?SortCoord.Object]RETURNS[Comparison]={

--compares a and b, returns less, equal, or greater

};

CompareNameObjects:PROC[a,b:SortNames.Object]RETURNS[Comparison]={

--compares a and b, returns less, equal, or greater

Btree.model!(Jan 14, 1983, 14:44:11)

LET@[Indigo]<Cedar>*CedarInstaces.model!*(July 25, 1982, 14:03:03)IN

LET*Instances*~@[Indigo]<Cedar>*Cedar Instandes.model!*(July 25, 1982, 14:10:12)IN

*BTree*:INTERFACE *BTree*~@[Ivy]<Schmidt>*BTree.cedar!*(Sept 9,1982, 13:52:55)

[*Ascii*],

*BTreeInst: BTree*~@[Ivy]<Schmidt>*BTreeImpl.cedar!*(Jan 14, 1983, 14:44:09)

*[] [Instances.Rope, Instances.IO, Instances.Space*]]]

CedarInterfaces.model!(July, 25, 1982, 14:03:03)

[

*Ascii*:INTERFACE~@[Indigo]<Cedar>*Ascii.cedar!*(July 10, 1982, 12:25:00)[],

*Rope*:INTERFACE~@[Indigo]<Cedar>*Rope.cedar!*(July 10, 1982, 17:00:00)*[],

*IO*:INTERFACE~@[Indigo]<Cedar>*IO.cedar!*(July 12, 1982, 11:00:00)*[],

*Space*:INTERFACE~@[Indigo]<Cedar>*Space.Cedar!*(June 10, 1982, 8:35:00)*[] ]

CedarInstances.model!(July 25, 1982, 14:10:12)

[*Ascii, Rope, IO, Space*]~

LET@*CedarInterface.model!*(July 25, 1982, 14:03:03) IN [

@[Indigo]<Cedar>*AsciiImpl.cedar!*(July 10, 1982, 12:30:00)[] [],

@[Indigo]<Cedat>*RopeImpl.cedat!*(July 10, 1982, 17:10:24)*[]* [],

@[Indigo]<Cedar>*IOImpl.cedar!*(July 20, 1982, 13:03:03)*[]*[],

@[Indigo]<Cedar>*Space.cedar!*(June 11, 1982, 15:00:00)*[]*[] ]

*FIG. 17*

Object type table

| Source object | Type |
|---|---|
| BTree.Cedar!(Sept 9, 1982, 13:52:55) | [INTERFACEAscii]· [INTERFACEBTree] |
| BTreeImpl.cedar!(Jan 9, 1983, 14:44:09) | [Rope:INTERFACERope, IO,Space:INTERFACE Space, BTree:INTERFACEBTree] |
|  | [[RopeInst:Rope, IO, SpaceInst:Space] [BTreeInst:BTree]] |

Projection table

| Source object | Parameter values | Results object |
|---|---|---|
| BTree.cedar!(Sept 9,1982, 13:52:55) | [Ascii.binary!23ACD904EFFA] | BTree.binary!43956A3C32F0 |
| BTreeImpl.cedar!(Jan 14, 1983, 14:44:09) | [Rope.binary!AC9023E76FA6, IO.binary!23843396A24f, Space.binary!8348823FF761, BTree.binary!43956A3C32F0] | BTreeImpl.binary!2045FFD283C |

*FIG. 18*

Version map

| Object name | File location |
| --- | --- |
| BTree.cedar!(Sept 9, 1982, 13:52:55) | [Ivy]<Schmidt>BTree.cedar4 |
| BTree.Impl.cedar!(Jan 14,1983, 14:44:09) | [Ivy]<Schmidt>BTreeImpl.cedar!9 |
| BTree.binary!43956A3C32F0 | [Ivy]<Schmidt>BTree.binary!2 |
| BTreeImpl.binary!2045FFD283C | [Ivy]<Schmidt>BTreeImpl.binary!5 |
| Ascii.binary!23ACD904EFFA | [Indigo]<Cedar>Ascii.binary23 |

*FIG. 19*

Release Tool: Phase Build

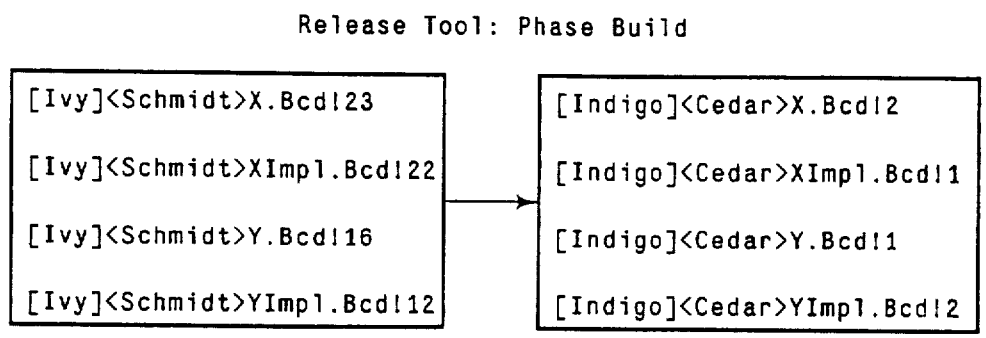

FIG. 26

Version Map After Release

| Index | File Location |
|---|---|
| X.Mesa of July 25,1982 14:03:02 | [Indigo]<Cedar>X.Mesa!2 |
| XImpl.Mesa of July 25,1982 14:05:06 | [Indigo]<Cedar>XImpl.Mesa!3 |
| Y.Mesa of July 25,1982 15:05:08 | [Indigo]<Cedar>Y.Mesa!1 |
| YImpl.Mesa of July 25,1982 15:07:03 | [Indigo]<Cedar>YImpl.Mesa!2 |
| X.Bcd of 1ABCD2346DED | [Indigo]<Cedar>X.Bcd!2 |
| XImpl.Bcd of 2ADEF345EDCA | [Indigo]<Cedar>XImpl.Bcd!1 |
| Y.Bcd of 3421ABD4235A | [Indigo]<Cedar>Y.Bcd!1 |
| YImpl.Bcd of 23455BBDC63B | [Indigo]<Cedar>YImpl.Bcd!2 |

FIG. 27

SOFTWARE VERSION MANAGEMENT SYSTEM

BACKGROUND OF THE INVENTION

This invention relates to software version management system and method for handling and maintaining software, e.g. software updating uniformily across the system, particularly in a large software development environment having a group of users or programmers. The system is also referred to as the "System Modeller".

Programs consisting of a large number of modules need to be managed. When the number of modules making up a software environment and system exceeds some small, manageable set, a programmer cannot be sure that every new version of each module in his program will be handled correctly. After each version is created, it must be compiled and loaded. In a distributed computing environment, files containing the source text of a module can be stored in many places in a distributed system. The programmer may have to save it somewhere so others may use it. Without some automatic tool to help, the programmer cannot be sure that versions of software being transferred to another user or programmer are the versions intended to be used.

A programmer unfamiliar with the composition of the program is more likely to make mistakes when a simple change is made. Giving this new programmer a list of the files involved is not sufficient, since he needs to know where they are stored and which versions are needed. A tool to verify a list of files, locations and correct versions would help to allow the program to be built correctly and accurately. A program can be so large that simply verifying a description is not sufficient, since the description of the program is so large that it is impractical to maintain it by hand.

The confusion of a single programmer becomes much worse, and the cost of mistakes much higher, when many programmers collaborate on a software project. In multi-person projects, changes to one part of a software system can have far-reaching effects. There is often confusion about the number of modules affected and how to rebuild affected pieces. For example, user-visible changes to heavily-used parts of an operating system are made very seldom and only at great cost, since other programs that depend on the old version of the operating system have to be changed to use the newer version. To change these programs, the "correct" versions of each have to be found, each has to be modified, tested, and the new versions installed with the new operating system. Changes of this type often have to be made quickly because the new system may be useless until all components have been converted. Members or users of large software projects are unlikely to make such changes without some automatic support.

The software management problems faced by a programmer when he is developing software are made worse by the size of the software, the number of references to modules that must agree in version, and the need for explicit file movement between computers. For example, a programming environment and system used at the Palo Alto Research Center of Xerox Corporation at Palo Alto, Calif., called "Cedar" now has approximately 447,000 lines of Cedar code, and approximately 2000 source and 2000 object files. Almost all binary or object files refer to other binary or object files by explicit version stamp. A program will not run until all references to an binary or object file refer to the same version of that file. Cedar is too large to store all Cedar software on the file system of each programmer's machine, so each Cedar programmer has to explicitly retrieve the versions he needs to run his system from remote storage facilities or file servers.

Thus, the problem falls in the realm of "Programming-the-Large" wherein the unit of discourses the software module, instead of "Programming-in-the-Small", where units include scalor variables, statements, expressions and the like. See the Article of Frank DeRemer and H. Kron, "Programming-in-the-Large versus Programming in the small", IEEE *Transactions on Software Engineering*, Vol. 2(2), pp. 80–86, June 1976.

To provide solutions solving these problems overviewed above, consider the following:

1. Languages are provided in which the user can describe his system.

2. Tools are provided for the individual programmer that automate management of versions of his programs. These tools are used to acquire the desired versions of files, automatically recompile and load aprogram, save new versions of software for others to use, and provide useful information for other program analysis tools such as cross-reference programs.

3. In a large programming project, software is grouped together as a release when the versions are all compatible and the programs in the release run correctly. The languages and tools for the individual programmer are extended to include information about cross-package dependencies. The release process is designed so production of release does not lower the productivity of programmers while the release is occurring.

To accomplish the foregoing, one must identify the kinds of information that must be maintained to describe the software systems being developed. The information needed can be broken down into three categories:

1. File Information: For each version of a system, the versions of each file in the system must be specified. There must be a way of locating a copy of each version in a distributed environment. Because the software is always changing, the file information must be changeable to reflect new versions as they are created.

2. Compilation Information: All files needed to compile the system must be identified. It must be possible to compute which files need to be translated or compiled or loaded and which are already in machine runnable format. This is called "Dependency Analysis." The compilation information must also include other parameters of compilation such as compiler switches or flags that affect the operation of the compiler when it is run.

3. Interface Information: In languages that require explicit delineation of interconnections between modules (e.g. Mesa, Ada), there must be means to express these interconnections.

There has been little research in version control and automatic software management. Of that, almost none has built on other research in the field. Despite good reasons for it, e.g. the many differences between program environments, and the fact that programming environments ususally emphasize one or two programming languages, so the management systems available are often closely related to those programming languages, this fact reinforces the singularity of this research. The following is brief review of previous work in this area.

(1) Make Program

The Make program, discussed in the Article of Stuart J. Feldman, "Make-A Program for Maintaining Computer Programs", *Software Practice & Experience*, Vol. 9 (4), April, 1979, uses a system description called the Makefile, which lists an acyclic dependency graph explicitly given by the programmer. For each node in the dependency graph, the Makefile contains a Make Rule, which is to be executed to produce a new version of the parent node if any of the son nodes change.

For example the dependency graph illustrated in FIG. 1 shows that x1.o depends on x1.c, and the file a.out depends on x1.o and x2.o. The Makefile that represents this graph is shown in Table I below.

TABLE I

| a.out: | x1.o | x1.o | x2.o |
|---|---|---|---|
|  | cc | x1.o | x2.o |
| x1.O: | x1.c |  |  |
|  | cc | −c | x1.c |
| x2.o: | x2.c |  |  |
|  | cc | −c | x2.c |

In Table I, the expression, "cc-c x1.c" is the command to execute and produce a new version of x1.o when x1.c is changed. Make decides to execute the make rule i.e., compile x1.c, if the file modification time of x1.c is newer than that of x1.o.

The description mechanism shown in Table I is intuitively easy to use and explain. The simple notion of dependency, e.g., a file x1.o, that depends on x1.c must be recompiled if x1.c is newer, works correctly vitually all the time. The Makefile can also be used as a place to keep useful commands the programmer might want to execute, e.g., print:

pr x1.c x2.c defines a name "print" that depends on no other files (names). The command "make print" will print the source files x1.c and x2.c. There is usually only one Makefile per directory, and, by convention, the software in that directory is described by the Makefile. This makes it easy to examine unfamiliar directories simply by reading the Makefile.

Make is an extremely fast and versatile tool that has become very popular among UNIX users. Unfortunately, Make uses modification times from the file system to tell which files need to be re-made. These times are easily changed by accident and are a very crude way of establishing consistency. Often the programmer omits some of the dependencies in the dependency graph, sometimes by choice. Thus, even if Make employed a better algorithm to determine the consistency of a system, the Makefile could still omit many important files of a system.

(2) Source Code Control System (SCCS)

The Source Code Control System (SCCS) manages versions of C source programs enforcing a check-in and check-out regimen, controlling access to versions of programs being changed. For a description of such systems, see the Articles of Alan L. Glasser, "The Evolution of a Source Code Control System", Proc. Software Quality & Assurance Workshop, Software Engineering Notes, Vol. 3(5), pp. 122-125, November 1978; Evan L. Ivie, "The Programmer's Workbench-A Machine for Software Development", *Communications of the ACM*, Vol. 20(10) pp. 746-753, October, 1977; and Marc J. Rochkind "The Source Code Control System", *IEEE Transactions on Software Engineering*, Vol. 1(4), pp. 25-34, April 1981.

A programmer who wants to change a file under SCCS control does so by (1) gaining exclusive access to the file by issuing a "get" command, (2) making his changes, and (3) saving his changed version as part of the SCCS-controlled file by issuing a "delta" command. His changes are called a "delta" and are identified by a release and level number, e.g., "2.3". Subsequent users of this file can obtain a version with or without the changes made as part of "delta 2.3". While the programmer has "checked-out" the file, no other programmers may store new deltas. Other programmers may obtain copies of the file for reading, however. SCCS requires that there be only one modification of a file at a time. There is much evidence this is a useful restriction in multi-person projects. See Glasser, Supra. SCCS stores all versions of a file in a special file that has a name prefixed by "s.". This "s." file represents these deltas as insertions, modifications, and deletions of lines in the file. Their representation allows the "get" command to be very fast.

(3) Software Manufacturing Facility (SMF)

Make and SCCS were unified in special tools for a development project at Bell Labs called the Software Manufacturing Facility (SMF) and discussed in the Article of Eugene Cristofer, F. A. Wendt and B. C. Wonsiewicz, "Source Control & Tools=Stable Systems", *Proceedings of the Fourth Computer Software & Applications Conference*, pp. 527-532, Oct. 29-31, 1980. The SMF uses Make and SCCS augmented by special files called slists, which list desired versions of files by their SCCS version number.

A slist may refer to other slists as well as files. In the SMF, a system consists of a master slist and references to a set of slists that describe subsystems. Each subsystem may in turn describe other subsystems or files that are part of the system. The SMF introduces the notion of a consistent software system: only one version of a file can be present in all slists that are part of the system. Part of the process of building a system is checking the consistency.

SMF also requires that each slist refer to at least one Makefile. Building a system involves (1) obtaining the SCCS versions of each file, as described in each slists, (2) performing the consistency check, (3) running the Make program on the version of the Makefile listed in the slist, and (4) moving files from this slist to an appropriate directory. FIG. 2 shows an example of a hierarchy of slists, where ab.sl is the master slist.

SMF includes a database of standard versions for common files such as the system library. Use of SMF solves the problem created when more than one programmer is making changes to the software of a system and no one knows exactly which files are included in the currently executing systems.

(4) PIE Project

The PIE project is an extension to Smalltalk developed at the Palo Alto Research Center of Xerox Corporation and set forth in the Articles of Ira P. Goldstein and Daniel G. Bobrow, "A Layered Approach to Software Design", *Xerox PARC Technical Report* CSL-80-5, December 1980; Ira P. Goldstein and Daniel G. Bobrow, "Descriptions for a Programming Environment", *Proceedings of the First Annual Conference of the National Association of Artificial Intelligence*, Stanford, Calif., August 1980; Ira P. Goldstein and Daniel G. Bobrow, "Representing Design Alternatives", *Proceed-*

*ings of the Artificial Intelligence and Simulation of Behavior Conference,* Amsterdam, July 1980; and the book "Smalltalk-80, The Language and It Implemention" by Adele Goldberg and David Robson and published by Addison-Wesley, 1983. PIE implements a network database of Smalltalk objects, i.e., data and procedures and more powerful display and usage primitives. PIE allows users to categorize different versions of a Smalltalk object into layers, which are typically numbered starting at zero. A list of these layers, most-preferred layer first, is called a context. A context is a search path of layers, applied dynamically whenever an object in the network database is referenced. Among objects of the same name, the one with the layer number that occurs first in the context is picked for execution. Whenever the user wants to switch versions, he or she arranges his context so the desired layer occurs before any other layers that might apply to his object. The user's context is used whenever any object is referenced.

The distinction of PIE's solution to the version control problem is the ease with which it handles the display of and control over versions. PIE inserts objects or procedures into a network that corresponds to a traditional hierarchy plus the threads of layers through the network. The links of the network can be traversed in any order. As a result, sophisticated analysis tools can examine the logically-related procedures that are grouped together in what is called a Smalltalk "class". More often, a PIE browser is used to move through the network. The browser displays the "categories", comprising a grouping of classes, in one corner of a display window. Selection of a category displays a list of classes associated with that category, and so on until a list of procedures is displayed. By changing the value of a field labeled "Contexts:" the user can see a complete picture of the system as viewed from each context. This interactive browsing features makes comparison of different versions of software very convenient.

(5) Gandalf Project

A project, termed the Gandalf project at Carnegie Mellon University, and discussed in the Article of A. Nico Habermann et al., "The Second Compendium of Gandalf Documention", CMU Department of Computer Science, May 1980, is implementing parts of an integrated software development environment for the GC language, an extension of the C language. Included are a syntax-directed editor, a configuration database, and a language for describing what is called system compositions. See the Articles of A. Nico Haberman and Dewayne E. Perry "System Compositions and Version Control for Ada", CMU Computer Science Department, May 1980 and A. Nico Haberman "Tools for Software System Construction", *Proceedings of the Software Tools Workshop, Boulder, Colo., May* 1979. Various Ph.D these have explored this language for system composition. See the Ph.D Thesis of Lee W. Cooprider "The Representation of Families of Software Systems", CMU Computer Science Department, CMU-CS-79-116, Apr. 14, 1979 and Walter F. Tichy, "Software Development Control Based on System Structure Description", CMU Computer Science Department, CMU-CS-80-120, January 1980.

Recent work on a System Version Control Environment (SVCE) combines Gandalf's system composition language with version control over multiple versions of the same component, as explained in the Article of Gail E. kaiser and A. Nico Habermann, "An Environment for System Version Control", in "The Second Compendium of Gandalf Documentation", CMU Department of Computer Science, Feb. 4, 1982. Parallel versions, which are different implementations of the same specification, can be specified using the name of the specific version. There may be serial versions of each component which are organized in a time-dependent manner. One of the serial versions, called a revision, may be referenced using an explicit time stamp. One of these revisions is designated as the "standard" version that is used when no version is specified.

Descriptions in the System Version Control Language (SVCL) specify which module versions and revisions to use and is illustrated, in part, in FIG. 3. A collection of logically-related software modules is described by a box that names the versions and revisions of modules available. Boxes can include other boxes or modules. A module lists each parallel version and revision available. Other boxes or modules may refer to each version using postfix qualifiers on module names. For example, "M" denotes the standard version of the module whose name is "M," and "M.V1" denote parallel version V1. Each serial revision can be specified with an "@," e.g., "M.V1@2" for revision 2.

Each of these expressions, called pathnames, identifies a specific parallel version and revision. Pathnames behave like those in the UNIX system: a path name that begins, for example, /A/B/C refers to box C contained in box B contained in A. Pathnames without a leading "/" are relative to the current module. Implementations can be used to specify the modules of a system, and compositions can be used to group implementations together and to specify which module to use when several modules provide the same facilities. These ways of specifying and grouping versions and revisions alloy virtually any level of binding: the user may choose standard versions or, if it is important, the user can be very specific about versions desired. The resulting system can be modified by use of components that specialize versions for any particular application as illustrated in FIG. 3.

SVCE also contains facilities for "System Generation". The Gandalf environment provides a command to make a new instantiation, or executable system, for an implementation or composition. This command compiles, links, and loads the constituent modules. The Gandalf editor is used to edit modules and edit SVCL implementations directly, and the command to build a new instantiation is given while using the Gandalf editor. Since the editor has built-in templates for valid SVCL constructs, entering new implementations and compositions is very easy.

SVCE combines system descriptions with version control, coordinated with a database of programs. Of the existing systems, this system comes closest to fulfilng the three previously mentioned requirements: Their file information is in the database, their recompilation information is represented as lines in the database between programs and their interface information is represented by system compositions.

(6) Intermetrics Approach

A system used to maintain a program of over one million lines of Pascal code is described in an Article of Arra Avakian et al, "The Design of an Integrated Support Software System", *Proceedings of the SIGPLAN '82 Syposium on Compiler Construction,* pp. 308–317, June 23-25, 1982. The program is composed of 1500 separately-compiled components developed by over 200 technical people on an IBM 370 system. Separately-compiled Pascal modules communicate through a database, called a compool, of common symbols and their absolute addresses. Because of its large size (90 megabytes, 42,000 names), a compool is stored as a base tree of objects plus some incremental revisions. A simple consistency check can be applied by a link editor to determine that two modules were compiled with mutually-inconsistent compools, since references to code are stamped with the time after which the object file had to be recompiled.

Management of a project this size poses huge problems. Many of their problems were caused by the lack of facilities for separate compilation in standard Pascal, such as interface-implementation distinctions. The compool includes all symbols or procedures and variables that are referenced by modules other than the module in which they are declared. This giant interface between modules severely restricts changes that affect more than one separately-compiled module. Such a solution is only suitable in projects that are tightly managed. Their use of differential-updates to the compool and creation times to check consistency makes independent changes by programmers on different machines possible, since conflicts will ultimately be discovered by the link editor.

(7) Mesa, C/Mesa and Cedar

Reference is now made to the Cedar/Mesa Environment developed at Palo Alto Research Center of Xerox Corporation. The software version management system or system modeller of the instant invention is implemented on this enviroment. However, it should be clear to those skilled in the art of organizing software in a distributed environment that the system modeller may be implemented in other programming systems involving a distributed environment and is not dependent in principle on the Cedar/Mesa environment. In other words, the system modeller may handle descriptions of software systems written in other programming languages. However, since the system modeller has been implemented in the Cedar/Mesa environment, sufficient description of this environment is necessary to be familiar with its characteristics and thus better understand the implementation of the instant invention. This description appears briefly here and more specifcally later on.

The Mesa Language is a derivative of Pascal and the Mesa language and programming is generally disclosed and discussed in the published report of James G. Mitchell et al, "Mesa Language Manual, Version 5.0", Xerox PARC Technical Report CSL-79-3, April 1979. Mesa programs can be one of two kinds: interfaces or definitions and implementations. The code of a program is in the implementation, and the interface describes the procedures and types, as in Pascal, that are available to client programs. These clients reference the procedures in the implementation file by naming the interface and the procedure name, exactly like record or structure qualification, e.g., RunTime.GetMemory[] refers to the procedure GetMemory in the interface RunTime. The Mesa compiler checks the types of both the parameters and results of procedure calls so that the procedures in the interfaces are as strongly type-checked as local, private procedures appearing in a single module.

The interconnections are implemented using records of pointers to procedure bodies, called interface records. Each client is passed a pointer to an interface record and accesses the procedures in it by dereferencing once to get the procedure descriptors, which are an encoded representation sufficient to call the procedure bodies.

A connection must be made between implementations (or exporters) and clients (or importers) of interfaces. In Mesa this is done by writing programs in C/Mesa, a configuration language that was designed to allow users to express the interconnection between modules, specifying which interfaces are exported to which importers. With sufficient analysis, C/Mesa can provide much of the information needed to recompile the system. However, C/Mesa gives no help with version control since no version information can appear in C/Mesa configurations.

Using this configuration language, users may express complex interconnections, which may possibly involve interfaces that have been renamed to achieve information hiding and flexibility of implementation. In practice, very few configuration descriptions are anything more than a list of implementation and client modules, whose interconnections are resolved using defaulting rules.

A program called the Mesa Binder takes object files and configuration descriptions and produces a single object file suitable for execution. See the Article of Hugh C. Lauer and Edwin H. Satterthwaite, "The Impact of Mesa on System Design", *Proceedings of the 4th International Conference on Software Engineering,* pp. 174–182, 1979. Since specific versions of files cannot be listed in C/Mesa descriptions, the Binder tries to match the implementations listed in the description with flies of similar names on the invoker's disk. Each object file is given a 48-bit unique version stamp, and the imported interfaces of each module must agree in version stamp. If there is a version conflict, e.g., different versions of an interface, the Binder gives an error message and stops binding. Most users have elaborate command files to retrieve what they believe are suitable versions of files to their local disk.

A Librarian, discussed in the Article of Thomas R. Horsley and William C. Lynch, "Pilot: A Software Engineering Case Study", *Proceedings of the 4th International Conference on Software Engineering,* pp. 94–99, 1979, is available to help control changes to software in multi-person projects. Files in a system under its control can be checked out by a programmer. While a file is checked out by one programmer, no one else is allowed to check it out until it has been checked in. While it is checked out, others may read it, but no one else may change it.

In one very large Mesa-language project, which is exemplified in the Article of Eric Harslem and Leroy E. Nelson, "A Retrospective on the Development of Star" *Proceedings of the 6th International Conference on Software Engineering,* September 1982, programmers submit modules to an integration service that recompiles all modules in a system quite frequently. A newly-compiled system is stored on a file system and testing begins. A team of programmers, whose only duty is to perform integrations of other programmer's software, fix incompatibilities between modules when possible. The major disadvantage of this approach is the amount of time between a change made by the programmer and when the change is tested.

The central concern with this environment is that even experienced programmers have a problem managing versions of Mesa or Cedar modules. The lack of a uniform file system, lack of tools to move version-consistent sets of modules between machines, and lack of complete descriptions of their systems contribute to the problem.

The first solution developed for version mangement of files is based on description files, also designated as DF files. The DF system automates version control for the user or programmer. This version management is described in more detail later on because experience with it is what led to the creation of the version management system of the instant invention. Also, the version management of the instant invention includes some functionality of the DF system integrated into an automatic program development system. DF files have information about software versions of files and their locations. DF files that describe packages of software are input to a release process. The release process checks the submitted DF files to see if the programs they describe are made from compatible versions of software, and, if so, copies the files to a safe location. A Release Tool performs these checks and copies the files. If errors in DF files are found and fixed employing an interactive algorithm. Use of the Release Tool allows one making a release, called a Release Master, to release software with which he may in part or even to a large extent, not be familiar with.

SUMMARY OF THE INVENTION

According to this invention, the system modeller provides for automatically collecting and recompiling updated versions of component software objects comprising a software program for operation on a plurality of personal computers coupled together in a distributed software environment via a local area network. As used herein, the term "objects" generally has reference to source modules or files, object modules or files and system models. The component software objects are stored in various different local and remote storage means throught the environment. The component software objects are periodically updated, via a system editor, by various users at their personal computers and then stored in designated storage means.

The system modeller employs models which are also objects. Each of the models is representative of the source versions of a particular component software object and contain object pointers including a unique name of the object, a unique identifier descriptive of the cronological updating of its current version, information as to an object's dependencies on other objects and a pathname representative of the residence storage means of the object. Means are provided in the system editor to notify the system modeller when any one of the objects is being edited by a user and the system modeller is responsive to such notification to track the edited objects and alter their respective models to the current version thereof. The system modeller upon command is adapted to retieve and recompile source files corresponding to altered models and load the binary files of the altered component software objects and their dependent objects into the user's computer.

The system modeller also includes accelerator means to cache the object pointers in the object models that never change to thereby avoid further retrieving of the objects to parse and to discern the object pointers. The accelerator means for the models includes (1) an object type table for caching the unique name of the object and its object type to enhance the analysis of a model by the modeller, (2) a projection table for caching the unique name of the source object, names of object parameters, compiler switches and compiler version to enhance the translation of objects into derived objects, and (3) a version map for caching the object pathname.

The system modeller is an ideal support system in a distributed software environment for noting and monitoring new and edited versions of objects or modules, i.e., source or binary or model files, and automatically managing the compilation, loading saving of such modules as they are produced. Further, the system modeller provides a means for organizing and controlling software and its revision to provide automatic support for several different kinds of program development cycles in a programming system. The modeller handles the daily evolution of a single module or a small group of modules modified by a single person, the assembly of numerous modules into a large system with complex interconnections, and the formal release of a programming system. The modeller can also efficiently locate a large number of modules in a big distributed file system, and move them from one machine to another to meet operational requirements or improve performance.

More particularly, the system modeller automatically manages the compilation, loading and saving of new modules as they are produced. The system modeller is connected to the system editor and is notified of new and edited versions of files as they are created by the system editor, and automatically recompiles and loads new versions of software. The system user decribes his software in a system model that list the versions of files used, the information needed to compile the system, and the interconnections between the various modules. The modeller allows the user or programmer to maintain three kinds of information stored in system models. The models, which are similar to a blueprint or schematic, describe particular versions of a system. A model combines in one place (1) information about the versions of files needed and hints about their locations, (2) additional information needed to compile the system, and (3) information about interconnections between modules, such as which procedures are used and where they are defined. To provide fast response, the modeller behaves like an incremental compiler so that only those software modules that have experienced a change are analyzed and recompiled.

System models are written in a SML language, which allows complete descriptions of all interconnections between software modules in the environment. Since these interconnections can be very complicated, the language includes defaulting rules that simplify system models in common situations.

The programmer uses the system modeller to manipulate systems described by the system models. The system modeller (1) manipulates the versions of files listed in models (2) tracks changes made by the programmer to files listed in the models, (3) automatically recompiles and loads the system, and (4) provides complete support for the release process. The modeller recompiles new versions of modules and any modules that depend on them.

The advantages of the system modeller is (1) the use of a powerful module interconnection language that expresses interconnections, (2) the provision of a user interface that allows interactive use of the modeller while maintaining an accurate description of the system, and (3) the data structures and algorithms developed to maintain caches that enable fast analysis of modules by the modeller. These advantages are further expandable as follows.

First, the system modeller is easy to use, perform functions quickly and is to run while the programmer is developing his software and automatically update system descriptions whenever possible. It is important that a software version management system be used while the programmer is developing software so he can get the most benefit from them. When components are changed, the descriptions are adjusted to refer to the changed components. Manual updates of descriptions by the programmer would slow his software development and proper voluntary use of the system seems unlikely. The system modeller functioning as an incremental compiler, i.e. only those pieces of the system that are actually change are recompiled, loaded and saved.

Second, the exemplified computing environment upon which the described system modeller is utilized is a distributed personal computer environment with the computers connected over an Ethernet local area network (LAN). This environment introduces two types of delays in access to versions of software stored in files: (1) if the file is on a remote machine, it has to be found, and (2) once found, it has to be retrieved. Since retrieval time is determined by the speed of file transfer across the network, the task of retrieving files is circumvented when the information desired about a file can be computed once and stored in a database. For example, the size of data needed to compute recompilation information about a module is small compared to the size of the module's object file. Recompilation information can be saved in a database stored in a file on the local disk for fast access. In cases where the file must be retrieved determining which machine and directory has a copy of the version desired can be very time consuming. The file servers can deliver information about versions of files in a remote file server directory at a rate of up to six versions per second. Since directories can have many hundreds of versions of files, it is not practical to enumerate the contents of a file server while looking for a particular version of a file. The solution presented here depends on the construction of databases for each software package or system that contains information about file locations.

Third, since many software modules, e.g., Cedar software modules, have a complicated interconnection structure, the system modeller includes a description language that can express the interconnection structure between the modules. These interconnection structures are maintained automatically for the programmer. When new interconnections between modules are added by the programmer, the modeller updates the model to add the interconnection when possible. This means the user has to maintain these interconnections very seldom. The modeller checks interconnections listed in models for accuracy by checking the parameterization of modules.

Further advantages, objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is an illustration of a dependency graph for a prior art software management system.

FIG. 2 is an illustration for a hierarchy of another prior art software management system.

FIG. 14 illustrates two different versions of a client module.

FIGS. 15a and 15b illustrate a client module to IMPORT different versions of the module that EXPORTs.

FIG. 16 illustrates a client module with different types of objects.

FIG. 17 is an example of a model.

FIG. 18 are examples of object type and projection tables.

FIG. 19 is an example of a version map.

FIG. 26 illustrates the Build Phase three of the release utility.

FIG. 27 is an example of a version map after release.

DESCRIPTION OF THE PREFERRED EMBODIMENTS

Figure 3:
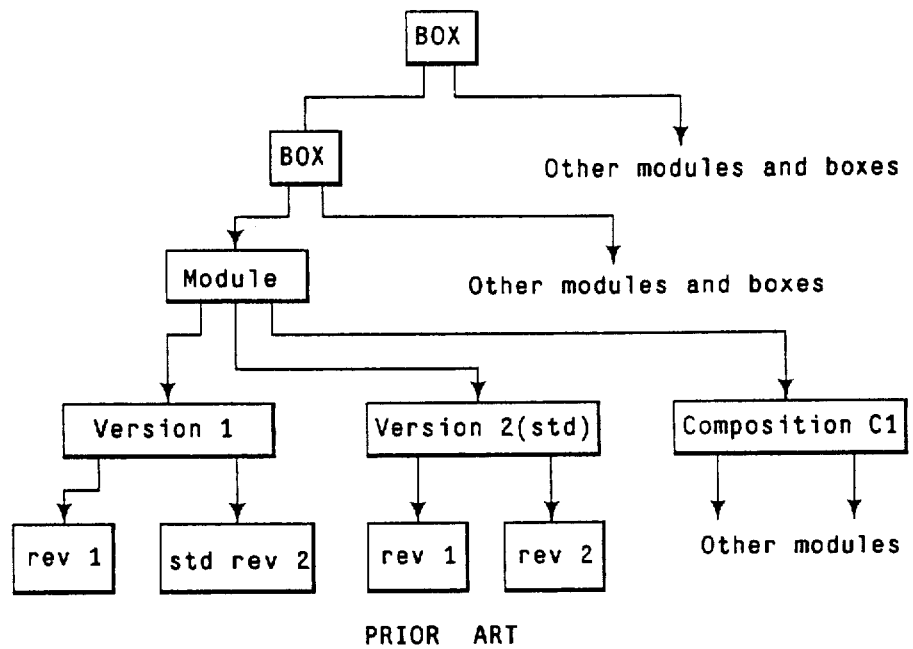
FIG. 3 is an illustration of the description specifiers of a still another prior art software management system.

1. The Cedar Environment, DF Software and the Release Process For The Cedar Environment One kind of management system of versions of software for a programmer in a distribution environment is a version control system of modest goals utilizing DF files. Each programmer lists files that are part of his system in a description file which is called a DF file.

Each entry in a DF file consists of a file name, its location, and the version desired. The programmer can use tools to retrieve files listed in a DF file and to save new versions of files in the location specified in the DF file. Because recompiling the files in his system can involve use of other systems, DF files can refer also to other DF files. The programmer can verify that, for each file in the DF file, the files it depends on are also listed in the DF file.

DF files are input to a release process that verifies that the cross-package references in DF files are valid. The dependencies of each file on other files are checked to make sure all files needed are also part of the release.

The release process copies all files to a place where they cannot be erroneously destroyed or modified.

The information about file location and file versions in DF files is used by programs running in the distributed programming environment. Each programmer has a personal computer on which he develops software. Each personal computer has its own disk and file system. Machines are connected to other machines using an Ethernet local area network. Files can be transferred by explicit request from the file system on one machine or computer to another machine or computer. Often transfers occur between a personal machine and a file storage means, e.g., a file server, which is a machine dedicated to servicing file requests, i.e., storing and permitting the retrieval of stored files.

The major research contributions of the DF system are (1) a language that, for each package or system described, differentiates between (a) files that are part of the package or system and (b) files needed from other packages or systems, and (2) a release process that does not place too high a burden on programmers and can bring together packages being released. A release is complete if and only if every object file needed to compile every source file is among the files being released. A release is consistent if, and only if, only one version of each package is being released and every other package depends on the version being released. The release process is controlled by a person acting as a Release Master, who spends a few days per monthly release running programs that verify that the release is consistent and complete. Errors in DF files, such as references to nonexistent files or references to the wrong versions of files, are detected by a program called the Release Tool. After errors are detected, the Release Master contacts the implementor and has him fix the appropriate DF file.

Releases can be frequent since performing each release imposes a low cost on the Release Master and on the programmers. The Release Master does not need to know details about the packages being released, which is important when the software of the system becomes too large to be understood by any one programmer. The implementor of each package can continue to make changes to his package until the release occurs, secure in the knowledge that his package will be verified before the release completes. Many programmers make such changes at the last minute before the release. The release process supports a high degree of parallel activity by programmers engaged in software development of a large dsitributed programing environment.

The DF system does not offer all that is needed to automate software development. DF files have only that information needed to control versions of files. No support for automatic recompilation of changed software modules is provided in the DF system. The only tool provided is a consistency checker that verifies that an existing system does not need to be recompiled.

In order to better understand the software version control system of the instant invention, a general understanding of the programming environment in which it is implemented is desirable. The programming environment is called Cedar. First, some general characteristics of Cedar.

The Cedar system changes frequently, both to introduce new function and also to fix bugs. Radical changes are possible and may involve recompilation of the entire system. System requirements are:

1. The system must manage these frequent changes and must give guarantees about the location and consistency of each set of files.

2. Each consistent set of Cedar software is called a "Cedar Release", which is a set of software modules carefully packaged into a system that can be loaded and run on the programmer's personal machine. These releases must be carefully stored in one place, documented and easily accessible.

3. Cedar releases should be accomplished, e.g., as often as once a week, since frequent releases make available in a systematic way new features and bug fixes. The number of users or programmers is small enough that releases do not need to be bug-free since users are generally tolerant of bugs in new components or packages in the system. When bugs do occur, it must be clear who is responsible for the software in which the bug occurs.

4. The system must minimize inconvenience to implementors and cannot require much effort from the person in charge of constructing the release. The scheme must not require a separate person whose sole job is control and maintenance of the system.

5. The system must be added on top of existing program development facilities, since it is not possible to change key properties of such a large distributed programing environment.

A limited understanding of the dependency relationships in the Cedar software systems is necessary, i.e., an overview of Cedar modules and dependencies.

The view taken in the Cedar system is that the software of a system is completely described by a single unit of text. An appropriate analogy is the sort of card deck that was used in the 1950s to boot, load and run a bare computer. Note that everything is said explicitly in such a system description. There is no operator intervention, such as to supply compiler switches or loader options, after the "go" button is initiated. In such a description there is no issue of "compilation order", and "version control" is handled by distributing copies of the deck with a version number written on the top of each copy.

The text of such a system naturally will have integral structure appropriate to the machine on which it runs as well as to the software system itelf. The present system is composed of modules that are stored as text in files termed modules or objects. This representation provides modularity in a physical representation, i.e., a file can name other files instead of literally including their text. In Cedar, these objects are Cedar modules or system models. This representation is convenient for users to manipulate, it allows sharing of identical objects or modules, and facilitates the separate compilation of objects or modules. But it is important to appreciate that there is nothing essential in such a representation. In principle, a system can always be expressed as a single text unit.

Unless care is taken, however, the integrity of the system will be lost, since the contents of the named files may change. To prevent this, files are abstracted into named objects, which are simply pieces of text. The file names must be unique and objects must be immutable. By this it is meant that each object has a unique name, never used for any other object. The name is stored as part of the object, so there is no doubt about whether a particular collection of bits is the object with a given name. A name is made unique by appending a unique identifier to a human-sensible string.

The contents of an object or module never change once the object is created. The object may be erased, in which case the contents are no longer accessible. If the file system does not guarantee immutability, it can be ensured by using a suitable checksum as the unique identifier of the object.

These rules ensure that a name can be used instead of the text of a module without any loss of integrity, in the sense that either the entire text of a system will be correctly assembled, or the lack of some module will be detected.

In Cedar, a Cedar module A depends on another Cedar module B when a change to B may require a change to A. If module A depends on module B, and B changes, then a system that contains the changed version of B and an unchanged version of A could be inconsistent. Depending on the severity of the change to B, the resulting system may not work at all, or may work while being tested but fail after being distributed to users. Cedar requires inter-module version checking between A and B that is very similar to Pascal typechecking for variables and procedures. As in Pascal, Cedar's module version checking is designed to detect inconsistency as soon as possible at compile time so that the resulting system is more likely to run successfully after development is completed.

Each Cedar module is represented as a source file whose names, for example, ends in "Mesa". The Cedar compiler produces an object file whose name, for example, ends in "Bcd". Each object file can be uniquely-identified by a 48-bit version stamp so no two object files have the same version stamp. Cedar modules depend on other modules by listing in each object file the names and 48-bit version stamps of object files they depend on. A collection of modules that depend on each other are required to agree exactly in 48-bit version stamps. For example, module A depends on version 35268AADB3E4 (hexadecimal) of module B, but B has been changed and is now version 31258FAFBFE4, then the system is inconsistent.

The version stamp of a compiled module is a function of the source file and the version stamps of the object files on which it depends on. If module A depends on module B which in turn depends on module C, and C is changed and compiled, then when B and A are compiled their version stamps will change because of the change to C.

There are three kinds of software modules in Cedar. They are called interface, implementation, and configuration. There are two programs that produce object files. They are the Cedar Complier and the Cedar Binder.

Executing code for a Cedar system is contained in an implementation module. Each implementation module can contain procedures, global variables, and local variables that are scoped using Pascal scoping rules. To call a procedure defined in another implementation module, the caller or client module must IMPORT a interface module that defines the procedure's type i.e. the type of the procedure's argument and result values. This interface module must be EXPORTED by the implementation module that defines it. This module is called the implementor.

Both the client and implementor modules depend on the interface module. This dependency is illustrated in FIG. 3. If the interface is recompiled, both client and implementor must be recompiled. The client and implementor modules do not depend on each other, so if either is compiled the other does not need to be. Thus, Cedar uses the interface-implementor module distinction to provide type safety with minimal recompilation cost.

Figure 5:
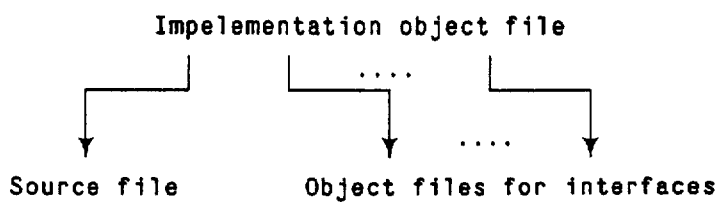
FIG. 5 is an illustration of a Cedar system source and object file dependency.

A compiler-produced object file depends on (1) the source module that was compiled and (2) the object files of any interfaces that this module IMPORTs or EXPORTs. This dependency is illustrated in FIG. 5. These interface modules are compiled separately from the implementations they described, and interface object files contain explicit dependency information. In this respect, Cedar differs from most other languages with interface or header files.

Another level of dependency is introduced by configuration modules, which contain implementation modules or other configuration modules. The programmer describes a set of modules to be packaged together as a system by writing a description of those modules and the interconnections among them in a language called C/Mesa. A C/Mesa description is called a configuration module. The source file for a configuration is input to the Cedar Binder which then produces an object file that contains all the implementation module object files. The Binder ensures the object file is composed of a logically-related set of modules whose IMPORTs and EXPORTs all agree in version. Large system of modules are often made from a set of configurations called sub-configurations. A configuration object file depends on (1) its source file and (2) the sub-configurations and implementation object files that are used to bind the configuration. These object files can be run by loading them with the Cedar Loader which will resolve any IMPORTs not bound by the Binder.

Figure 6:
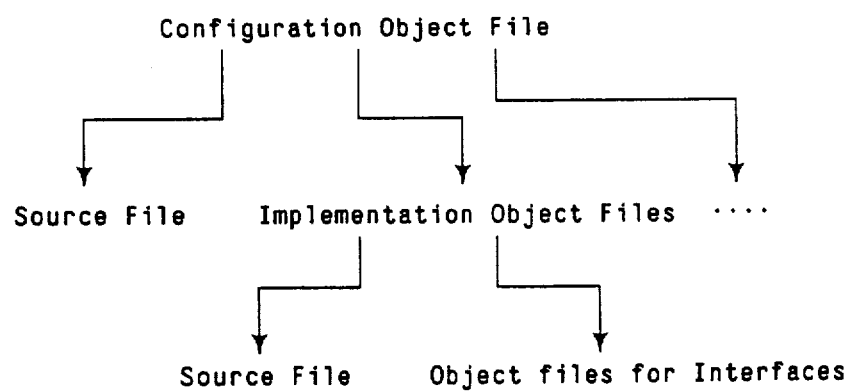
FIG. 6 is an illustration of a dependency graph for a Cedar System.
Figure 4:
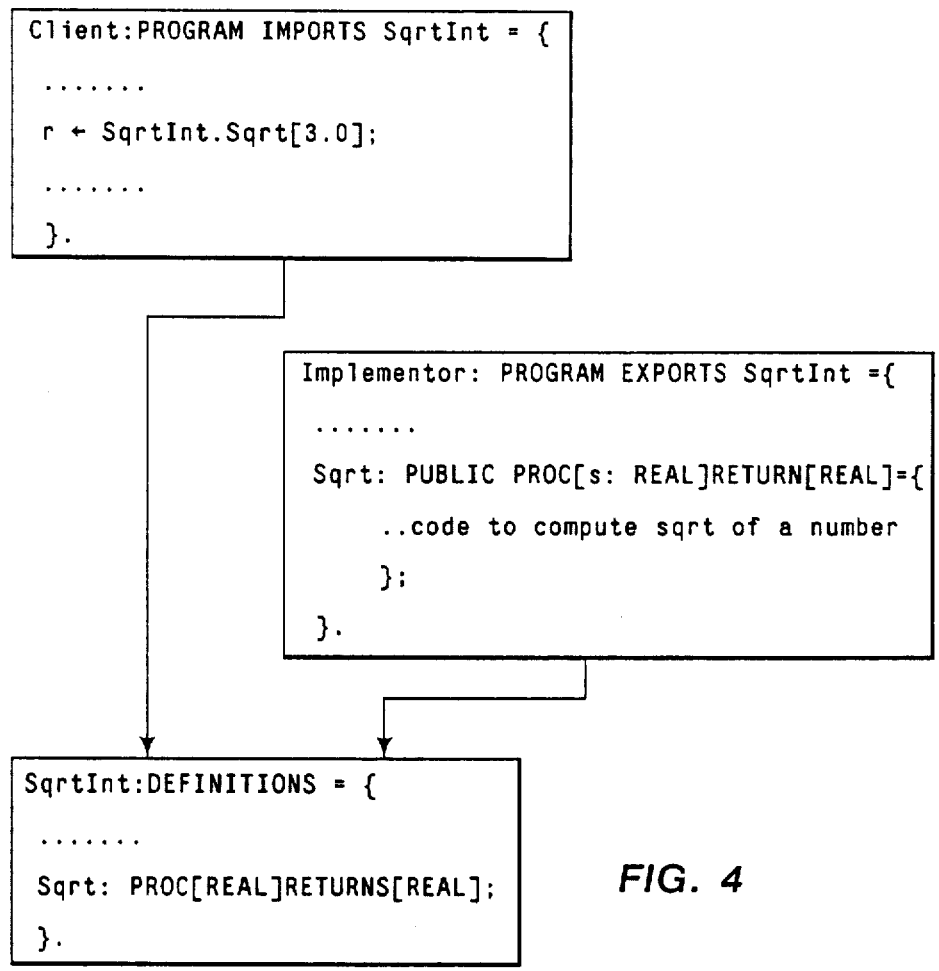
FIG. 4 is an illustration of a Cedar system client and implementor module dependency.

In general, a Cedar system has a dependency graph like that illustrated in FIG. 6.

Figure 7:
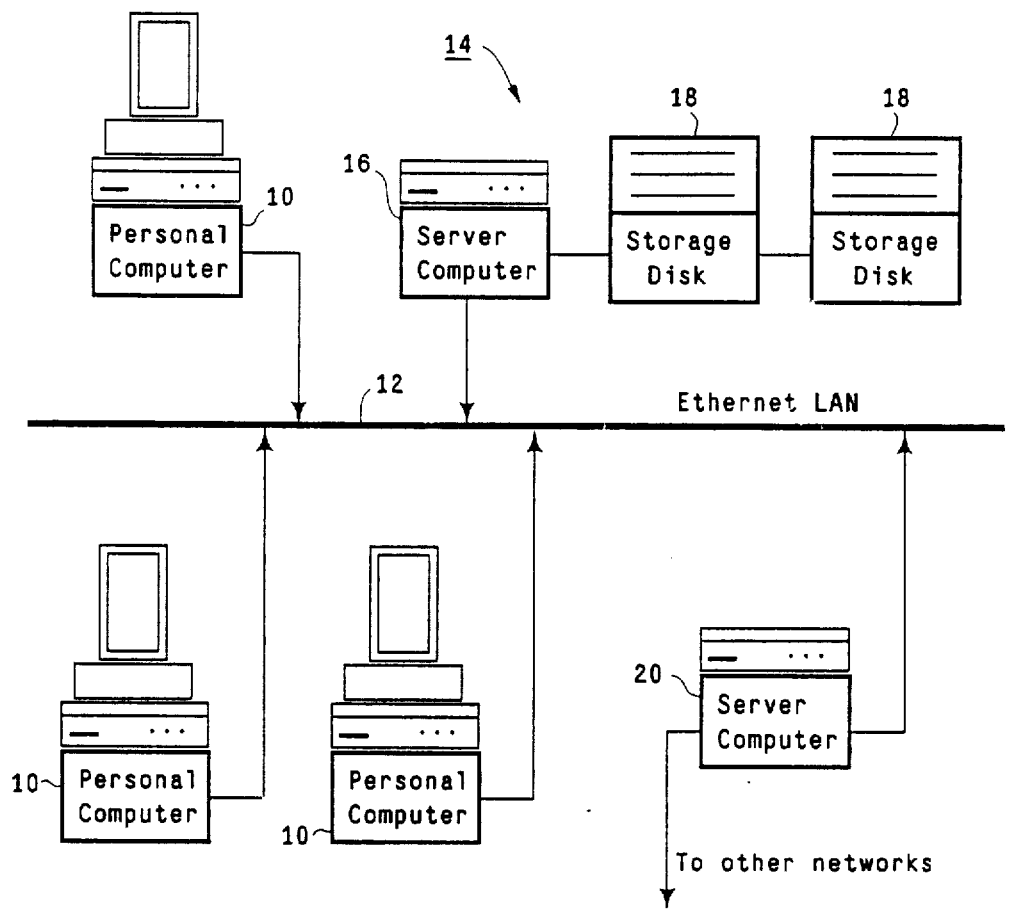
FIG. 7 is an example of a typical distributed computer evironment.
Figure 8:
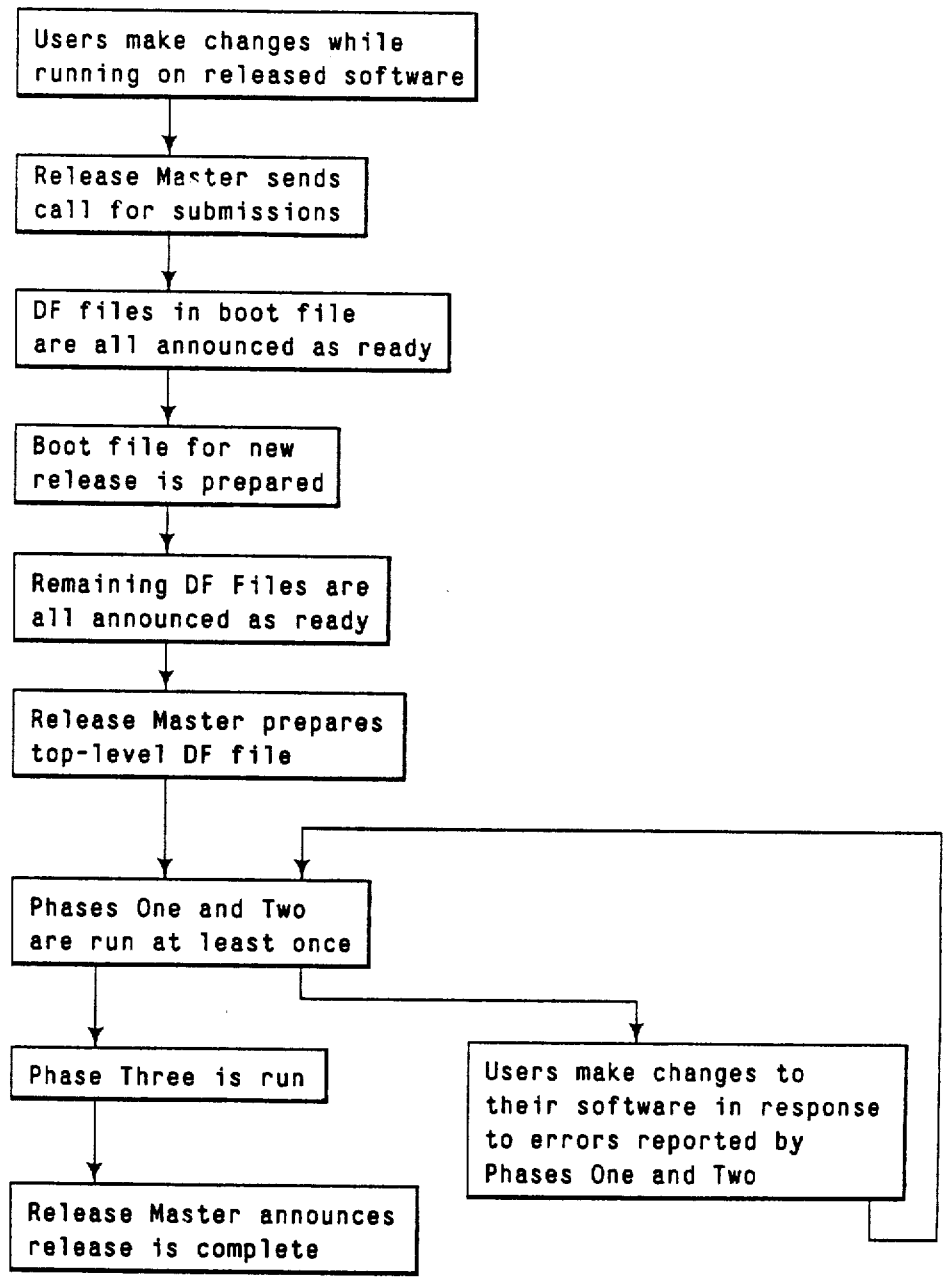
FIG. 8 is a flow diagram of the steps for making a release in a distributed computer environment.

Each Cedar programmer has its own personal computer, which is connected to other computers by an Ethernet local area network (LAN). Most files comprising a system are stored on central file servers dedicated to serving file requests and are copied from the central file server(s) to the personal machine by an explicit command, which is similar to the Arpanet "ftp" command. FIG. 7 illustrates a typical environment. In such an environment, a plurality of workstations comprising a personal computer or machine 10 with keyboard, display and local memory are connected to an Ethernet LAN via cable 12. Also connected to cable 12 is file server 14 comprising a server computer 16 and storage disk units 18 capable of storing large amounts of files under designated path or directory names. Cable 12 is also connected to a gateway computer 20 which provides access and communication to other LANs.

The user of a machine 10 must first install a boot file that is given control after the machine is powered on. Cedar users install the Cedar boot file that contains the operating system and possibly pre-loaded programs.

Since the Binder and Loader ensure that the version stamps of Cedar modules all agree, all Cedar modules could be bound together and distributed to all users for use as the Cedar boot file. However, users who wanted to make changes would have to re-bind and load the system every time they changed a module to test their changes. The resulting boot file would be very large and difficult to transfer and store on the disks of the personal machines. To avoid these problems, Cedar users install this boot file on their machine, which contains a basic system to load and execute Cedar programs, a file system, and a pre-loaded editor and then retrieve copies of programs they want to run that are not already in the boot file. These programs are thus loaded as they are needed.

Changes to these programs are possible as long as the versions of interfaces pre-loaded in the Cedar boot file agree with the versions IMPORTed by the program being loaded. Since the boot file EXPORTs are more than 100 interfaces, the programmer can quickly become confused by version error messages for each of the interfaces he uses. This problem could be solved simply by disallowing changes to the Cedar interfaces except, say, once annually. However, it is desirable to be able to adjust interfaces frequently to reflect new features and refinements as they are understood.

Control of software in module interconnection languages is analogous to control over types in conventional programming languages, such as Pascal. Still opposed by some, strong type-checking in a language can be viewed as a conservative approach to programming, where extra rules, in the form of type equivalence, are imposed on the program. Proponents claim these rules lead to the discovery of many programming errors while the program is being compiled, rather than after it has started execution.

Like strong type-checking of variables, type-checking in a language like Cedar with the explicit notion of an interface module can be performed at the module level so that incompatibilities between modules can be resolved when they are being collected together rather than when they are executing. As in the strong type-checking case, proponents claim this promotes the discovery of errors sooner in the development of programs.

Incompatible versions of modules, like incompatible types in a programming languages, may be corrected by the programmers involved. Many times, complex and subtle interdependencies exist between modules, especially when more than a few programmers are involved and the lines of communication between them are frayed or partially broken. In the Cedar Xerox environment, where each module is a separate file and development occurs on different personal computers or machines, module-level type-checking is more important than type-checking of variables in conventional programming languages. This is because maintaining inter-module type consistency is by definition spread over different files, possibly on different computers by more than one programmer/user, while maintaining type-consistency of variables is usually localized in one file by one programmer/user on one computer.

Users in Cedar are required to group logically-related files, such as the source and object files for a program they are developing, into a package. Each software package is described by a DF file that is a simple text file with little inherent structure that is editable by the programmer/user. The DF file lists all the files grouped together by the implementor as a package. For each file, the DF file gives a pathname or location where the file can be found and information about which version is needed.

In Cedar, files are stored on remote file servers with names like "Ivy" or "Indigo" and have path or directory names, e.g., "Levin>BTrees>". A file like "BTreeDefs.Mesa" would be referenced as "[Ivy]<Levin>BTrees>BTreeDefs.Mesa". In addition, when created, each file is assigned a creation time. Therefore "BTreeDefs.Mesa Of May 13, 1982 2:30 PM" on "[Ivy]<Levin>BTrees>" defines a particular version.

A DF file is a list of such files. For syntactic grouping, we allow the user to list files grouped under common directories. The implementor of a B-tree package, for example, might write in his DF file, called BTrees.DF:

| Directory [Ivy]<Levin>BTrees> | | |
|---|---|---|
| BTreeDefs.Mesa | 2-Oct-81 | 15:43:09 | to refer to the file [Ivy]<Levin>BTrees>BTreeDefs.Mesa created at 2-Oct-81 15:43:09.

If, for example, the BTree package included an object file for BTreeDefs.Mesa, and an implementation of a B-tree package, it could be described in BTrees.DF as:

| Directory [Ivy]<Levin>BTrees> | | |
|---|---|---|
| BTreeDefs.Mesa | 2-Oct-81 | 15:43:09 |
| BTreeDefs.Bed | 2-Oct-81 | 16:00:28 |
| BTreeImpl.Mesa | 2-Oct-81 | 15:28:54 |
| BTreeImpl.Bed | 2-Oct-81 | 16:44:31 |

Two different DF files could refer to different versions of the same file by using references to files with different create dates.

There are cases where the programmer wants the newest version of a file. If the notation, ">", appears in place of a create time notation, the DF file refers to the newest version of a file on the directory listed in the DF file. For example,

| Directory [Ivy]<Pilot>Defs> | |
|---|---|
| Space.Bcd | > | refers to the newest version of Space.Bcd on the directory [Ivy]<Pilot>Defs>. This is used mostly when the file is maintained by someone other than the programmer and is content to accept the latest version of the file.

Users are encouraged to think of the local disk on their personal computer as a cache of files whose "true" locations are the remote servers. A program called BringOver assures the versions listed in a DF file are on the local computer disk.

Since DF files are editable, the programmer who edits, for example, BTreeDefs.Mesa could, when ready to place a new copy on the server,Ivy, store it manually and edit the DF file to insert the new create time for the new version.

For large numbers of files, this would always be error prone, so a StoreBack program provides automatic backup of changed versions (1) by storing files that are listed in the DF file but whose create date differs from the one listed in the DF on the assumption that the file has been edited, and (2) by updating the DF file to list the new create dates. The DF file is to be saved on the file server, so we allow for a DF self-reference that indicates where the DF file is stored. For example, in BTrees.DF:

| Directory [Ivy]<Levin>BTrees> | | |
|---|---|---|
| BTrees.DF | 20-Oct-81 | 9:35:09 |
| BTreeDefs.Mesa | 2-Oct-81 | 15:43:09 |
| BTreeDefs.Bed | 2-Oct-81 | 16:00:28 |

-continued

| Directory [Ivy]<Levin>BTrees> | | |
|---|---|---|
| BTreeImpl.Mesa | 2-Oct-81 | 15:28:54 |
| BTreeImpl.Bed | 2-Oct-81 | 16:44:31 | the first file listed is a self-reference. The StoreBack program arranges that the new version of BTrees.DF will have the current time as its create date.

The Cedar system itself is a set of implementaton modules that export common system interfaces to the file system, memory allocator, and graphics packages. Assume the B-tree package uses an interface from the allocator. The user makes this dependency explicit in their DF file. The BTree package will then IMPORT the interface "Space", which is stored in object form in the file "Space.Bcd".

The BTree DF package will reflect this dependency by "importing" Space.Bcd from a DF file "PilotInterfaces.DF" that lists all such interfaces. BTrees.DF will have an entry:

| Imports [Indigo]<Cedar>Top> PilotInterfaces.DF Of Using[Space.Bcd] | 2-Oct-81 | 15:43:09 |
|---|---|---|

The "Imports" in a DF file is analogous to the IMPORTS in a Cedar program. As in Cedar modules, BTrees.DF depends on Pilot.DF. Should "Space.Bcd" and its containing DF file "Pilot.DF" change, then BTrees.DF may have to also change.

The programmer/user may want to list special programs, such as a compiler-compiler or other preprocessors, that are needed to make changes to his system. This is accomplished using the same technique of IMPORTing the program's DF file.

For the individual programmer, there are two direct benefits from making dependency information explicit in his DF file. First, the BringOver program will ensure that the correct version of any imported DF files are on the local disk, so programmers can move from one personal computer to another and guarantee they will have the correct version of any interfaces they reference. Second, listing dependency information in the DF file puts in one place information that is otherwise scattered across modules in the system.

How does the programmer/user know which files to list in his DF file? For large systems, under constant development, the list of files is long and changes frequently. The programmer can run a program VerifyDF that analyzes the files listed in the DF file and warns about files that are omitted. VerifyDF analyzes the dependency graph, an example of which is illustrated in FIG. 6, and analyzes the versions of (1) the source file that was compiled to produce the object file and (2) all object files that this object file depends on. VerifyDF analyzes the modules listed in the DF file and constructs a dependency graph. VerifyDF stops its analysis when it reaches a module defined in another package that is referenced by IMPORTs in the DF. Any modules defined in other packages are checked for versionstamp equality, but no modules that they depend upon are analyzed, and their sources do not need to be listed in the package's DF file.

VerifyDF understands the file format of object files and uses the format to discover the dependency graph, but otherwise it is quite general. For example, it does not differentiate between interface and implementation files. VerifyDF could be modified to understand object files produced by other language compilers as long as they record all dependencies in the object file with a unique version stamp. For each new such language, VerifyDF needs (1) a procedure that returns the object version stamp, source file name and source create time, and (2) a procedure that returns a list of object file names and object version stamps that a particular object file depends on.

If the programmer lists all such package and files he depends on, then some other programmer on another machine will be able to retrieve, using BringOver command, all the files he needs to make a change to the program and then run StoreBack to store new versions and produce a new DF file.

Using these tools, that is BringOver, StoreBack, VerifyDF, the programmer/user can be sure he has a DF file that lists all the files that are needed to compile the package (completeness) and that the object files were produced from the source files listed in the DF file, and there are no version stamp discrepancies (consistency). The programmer can be sure the files are stored on central file servers and can turn responsibility for a package over to another programmer by simply giving the name of the DF file.

DF files can be used to describe releases of software. Releases are made by following a set of Release Procedures, which are essentially managerial functions by a Release Master and requirements placed on implementors/users. A crucial element of these Release Procedures is a program called the Release Tool, which is used to verify that the release is consistent and complete, and is used to move the files being released to a common directory on a designated file server.

If the packages a programmer depends on change very seldom, then use of the tools outlined above is sufficient to manage versions of software. However, packages that almost everyone depends on may be changed. A release must consist of packages that, for example, all use the same versions of interfaces supplied by others. If version mismatches are present, modules that IMPORT and EXPORT different versions of the same interface will not be connected properly by the loader. In addition to the need for consistency and completeness across an entire release, the component files of a particular release must be carefully saved somewhere where they are readily available and will not be changed or deleted by mistake, until an entire release is no longer needed.

The administration of Cedar releases are organized around an implementor/user who is appointed Release Master. In addition to running the programs that produce a release, he is expected to have a general understanding of the system, to make decisions about when to try to make a release, and to compose a message describing the major changes to components of the release.

Once he decides to begin the release process after conferring with other implementors and users, the Release Master sends a "call for submissions" message through an electronic mail system of the distributed system to a distribution list of programmers/users who have been or are planning to contribute packages to the release. Over a period of a few days, implementors/users are expected to wait until new versions of any packages they depend on are announced, produce a new version on some file server and directory of their choosing, and then announce the availability of their own packages.

One message is sent per package, containing, for example, "New Version of Pkg can be found on [Ivy]<Schmidt>Pkg.DF, that fixes the bug . . . ". Programmers who depend on Pkg.DF are expected to edit their DF files by changing them to refer to the new version. Since often it is the newest version, clients of Pkg.DF usually replace an explicit date by the notation, ">". They might refer to Pkg.DF by inserting:

```
Imports [Ivy]<Schmidt>Pkg.DF Of>
       Using[File1.Bed. File2.Bed]
``` in their DF file.

If the package is not changed, a message to that effect will be sent. These submissions do not appear in lock step since changes by one implementor may affect packages that are "above" them in the dependency graph.

This pre-release integration period is a parallel exploration of the dependency graph of Cedar software by its implementor/users. If an implementor is unsure whether he will have to make changes as a result of lower level bug fixes, for instance, he is expected to contact the implementor of the lower package and coordinate with him. Circular DF-dependencies may occur, where two or more packages use interfaces exported by each other. In circular cases, the DF files in the cycle have to be announced at the same time or one of the DF files has to be split into two parts: a bottom half that the other DF file depends on and a top half that depends on the other DF file.

The Release Master simply monitors this integration process and when the final packages are ready, begins the release. FIG. 7 illustrates the steps being taken to accomplish a release.

Once all packages that will be submitted to the release are ready, the Release Master prepares a top-level DF file that lists all the DF files that are part of the release. Packages that are not changed relative to a previous release are also listed in this DF file. DF files are described using a construct similar to "Imports" discussed earlier. The contents of each DF file are referenced by an Include statement, e.g.,

```
Include [Ivy]<Levin>BTrees>BTrees.DF Of>
``` refers to the newest version of the BTree package stored on Levin's working directory <Levin>BTrees>. Include is treated as macro-substitution, where the entire contents of BTrees.DF are analyzed by the Release Tool as if they were listed directly in the top-level DF.

The Release Master uses the top-level DF as input to phase one of the Release Tool. Phase one reads all the included DF files of the release and performs a system-wide consistency check. A warning message is given if there are files that are part of the release with the same name and different creation times (e.g., BTreeDefs.Mesa of 20-May-82 15:58:23 and also another version of 17-Apr-82 12:68:33). Such conflicts may indicate that two programmers are using different versions of the same interface in a way that would not otherwise be detected until both programs were loaded on the same computer. These warnings may be ignored in cases where the Release Master is convinced that no harm will come from the mismatch. For example, there may be more than one version of "Queue.Mesa" in a release since more than one package has a queue implementation, but each version is carefully separated and the versions do not conflict.

Phase one also checks for common blunders, such as a DF file that does not refer to newest versions of DF files it depends on, or a DF file that refers to system or program files that do not exist where the DF file indicates they can be found. The Release Master makes a list, package by package, of such blunders and calls each user and notifies them they must fix their DF files.

Phase one is usually repeated once or twice until all such problems are fixed and any other warnings are judged benign. Phase two guarantees system wide completeness of a release by running VerifyDF will warn of files that should have been listed in the DF file but were omitted. Implementor/users are expected to run VerifyDF themselves, but during every release, ot is easy for at least one to forget. Any omissions must be fixed by the implementor/user.

Once phases one and two are completed successfully, the Release Master is fairly certain there are no outstanding version of system composition problems, and he can proceed to phase three.

To have control over the deletion of old releases, phase three moves all files that are part of a release to a directory that is mutable only by the Release Master. Moving files that are part of the release also helps users by centralizing the files in one phase. The DF files produced by users, however, refer to the files on their working directories. We therefore require that every file mentioned in the DF files that are being released have an additional phrase "ReleaseAsreleasePlace". The BTrees.DF example would look like:

| Directory [Ivy]<Levin>BTrees> | | |
|---|---|---|
| Release As [Indigo]<Cedar>Top> | | |
| BTrees.DF | 20-Oct-81 | 9:35:09 |
| ReleaseAs [Indigo]<Cedar>BTrees> | | |
| BTreeDefs.Mesa | 2-Oct-81 | 15:43:09 |
| BTreeDefs.Bed | 2-Oct-81 | 16:00:28 |
| BTreeImpl.Mesa | 2-Oct-81 | 15:28:54 |
| BTreeImpl.Bed | 2-Oct-81 | 16:44:31 | which indicates a working directory as before and a place to put the stable, released versions. By convention, all such files must be released onto subdirectories of [Indigo]<Cedar>. To make searching for released DF files on the <Cedar> directory easier, each DF file's self-reference must release the DF file to the special subdirectory <Cedar>Top>. When the third phase is run, each file is copied to the release directory, e.g., B-tree files are copied to <Cedar>BTrees> and new DF files are written that describe these files in their release positions, e.g.,

| Directory [Indigo]<Cedar>Top> | | |
|---|---|---|
| Came From [Ivy]<Levin>BTrees> | | |
| BTrees.DF | 9-Nov-81 | 10:32:45 |
| Directory [Indigo]<Cedar>BTrees> | | |
| Came From [Ivy]<Levin>BTrees> | | |
| BTreeDefs.Mesa | 2-Oct-81 | 15:43:09 |
| BTreeDefs.Bed | 2-Oct-81 | 16:00:28 |
| BTreeImpl.Mesa | 2-Oct-81 | 15:28:54 |
| BTreeImpl.Bed | 2-Oct-81 | 16:44:31 |

The additional phrase "CameFrom" is inserted as a comment saying where the file(s) were copied from.

The other major function of phase three is to convert references using the "newest version" notation, ">", to be explicit dates, since "newest version" will change for every release. Phase three arranges that a reference like:

---
Imports[Ivy]<Levin>BTrees>BTrees.DF Of>
Using[BtreeDefs.Bed]
--- becomes

---
Imports [Indigo]<Cedar>BTrees>Btrees.DF Of date
Came from [Ivy]<Levin>BTrees>
Using [BTreeDefs.Bed]
--- where date is approximately the time that phase three is run.

The notion of a "Cedar Release" has many advantages. In addition to a strong guarantee that the software will work as documented, it has an important psychological benefit to users as a firewall against disasters, since programmers are free to make major changes that may not work at all, and are secure in the knowledge that last release is still available to fall back upon. Since users can convert back and forth between releases, users have more control over which versions they use. There is nothing wrong with more than one such release being in use at one time by different programmer/users, since each programmer has his own personal computer. Users are also allowed to convert to new releases at their own pace.

This approach to performing releases fulfills initial requirements:

(1). All files in the release have been moved to the release directory. These files are mutually consistent versions of software. All DF files refer to files known to be on the release directory.

(2). As described earlier, we cannot make a configuration module that contains all the modules in a release. Cedar releases are composed of (a) a boot file and (b) programs that are mutually consistent and can be run on a personal machine with the boot file being released. Phase two runs VerifyDF on all the components to guarantee that the versions of source and object files listed in the DF file are the ones actually used to build the component and guarantees that all files needed to build the component are listed in the DF file, so no files that conflict in version can be omitted.

(3). The release process is automatic enough that frequent releases are possible. Bugs in frequent releases are easily reported since the concept of ownership is very strongly enforced by our approach. The programmer who provides new versions of software is the recipient of bug reports of his software.

(4). The Release Master is required to (a) decide when to make a release, (b) send a call-for-submissions message, (c) make a to-level DF file and run the Release Tool, and (d) send a message announcing the release's completion. Because releases are expected, over time, to include more and more system programs, it is important that the Release Master not need to compile packages other than any packages he may be contributing to the release. Indeed, no single person has ever known how to compile the entire system by himself.

Since the implementors use DF files for maintaining their own software as well as for submitting components to the release, there is little additional burden on the implementors when doing a release. If the burden were too high, the implementors would delay releases and overall progress would be slowed as the feedback from users to implementors suffered.

(5). A general database system to describe the dependency hierarchy of packages when we are producing systems is not needed. A message system is used, rather than a database of information that the programmers can query, to notify implementors that packages they may depend on are ready.

Many aspects of bootstrapping Cedar are simplified when interfaces to the lowest and most heavily used parts of the boot file are not changed. Some major releases use the same versions of interfaces to the system object allocator and fundamental string manipulation primitives. Most major releases use the same versions of interfaces to the underlying Pilot system such as the file system and process machinery. The implementations of these stable parts of the system may be changed in ways that do not require interface changes.

In the Cedar environment, two previous releases have included changes to the interfaces of the operating system, called Pilot and discussed in the Article of Redell et al. "Pilot: An Operating System for a Personal Computer", *Proceedings of the Seventh Symposium on Operating System Principles,* December 1979, and thereby forced changes in the style of integration for those releases. Since the released loader cannot load modules that refer to the new versions of operating system interfaces, the software of Cedar environment that is preloaded in the boot file must all be recompiled before any changes can be tested. Highest priority is given to producing a boot file in which these changes can be tested.

Figure 9:
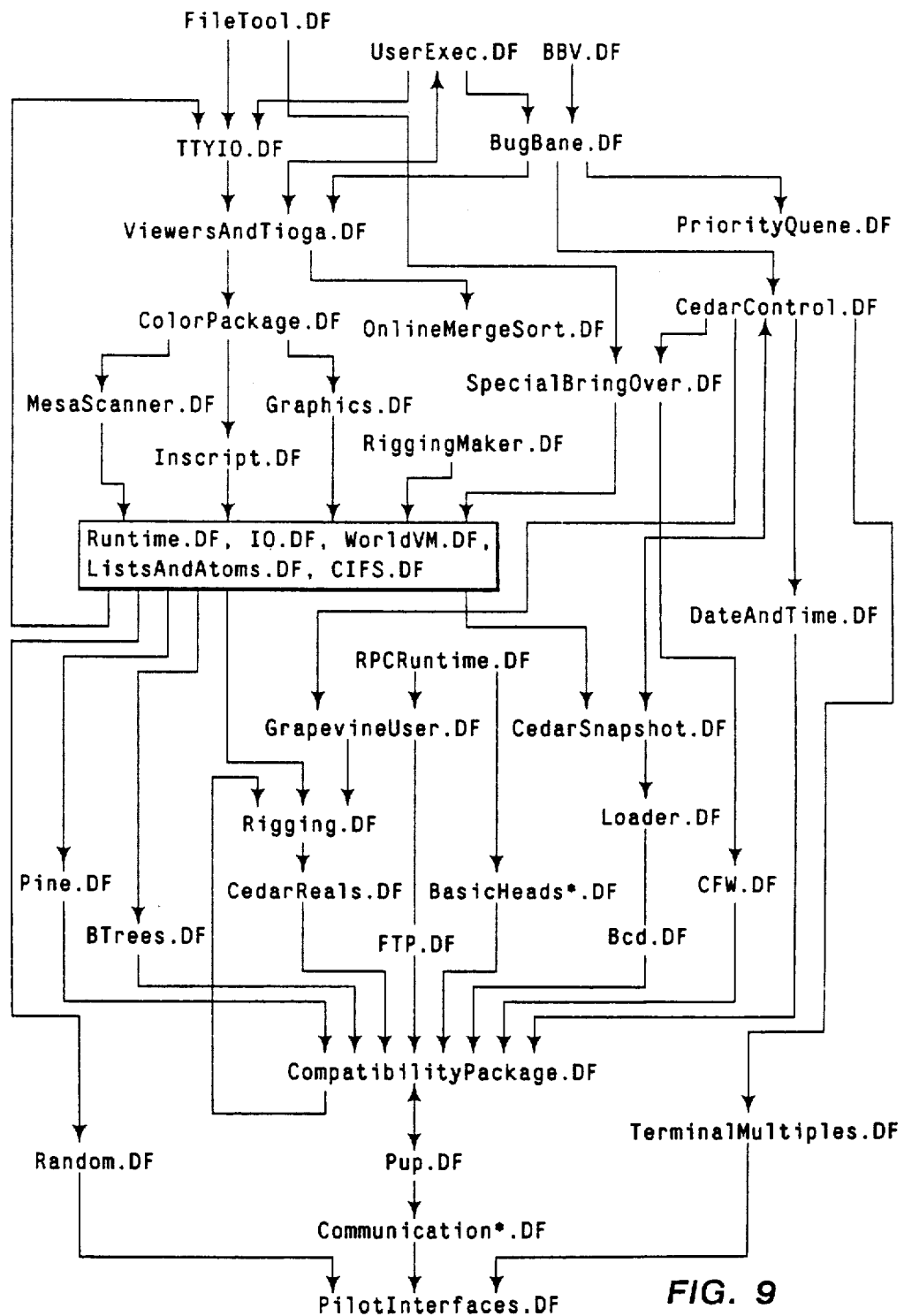
FIG. 9 is a dependency graph for DF files in the boot file.

If the DF files describing the Cedar system were layered in hierarchical order, with the operating system at the bottom, this boot file could be built by producing new versions of the software in each DF file in DF-dependency order. FIG. 9 shows the dependency graph for DF files in the boot file, where an arrow from one DF file, e.g., Rigging.DF, to another, e.g., Cedar-Reals.DF, indicates Rigging.DF IMPORTS some file(s) from CedarReals.DF. In this dependency graph, "tail" DF files depend on "head" DF files. Double headed arrows indicate mutual dependency. Basic Heads.DF means that this DF file includes other files, BasicHeadsDorado.DF, BasicHeadsDO.DF and BasicHeadCommon.DF, Communication.DF includes CommunicationPublic.DF, Communication-Friends.DF and RS232Interfaces.DF. CompatabilityPackage.DF includes MesaBAsics.DF.

Note that Rigging.DF also depends on CompatibilityPackage.DF, but the dependency by Cedar-Reals.DF on CompatibilityPackage.DF ensures a new version of Rigging.DF will be made after both lower DF files. The PilotInterfaces.DF file is at the bottom and must be changed before any other DF files.

Figure 10:
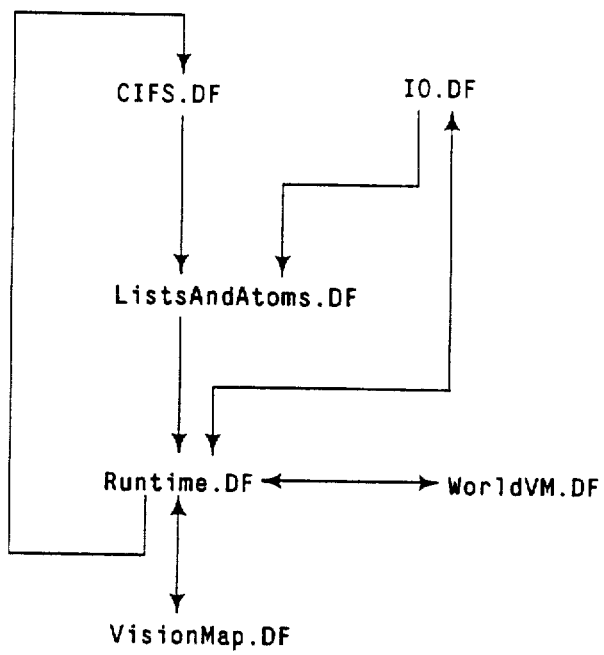
FIG. 10 is a dependency graph illustrative of a detail in the boot file.

This dependency graph is not acrylic, however. The most extreme cycle is in the box with six DF files in it, which is expanded in FIG. 10. Each DF file is in a cycle with at least one other DF file, so each DF file depends on the other, and possibly indirectly, and no DF file can be announced "first". There is an ordering in which these component can be built: If the interfaces listed in each of the DF files are compiled and DF files containing those interfaces are stored on <PreCedar>, each programmer can then compile the implementation modules in this component and then store the remaining files on <PreCedar>.

Figure 11:
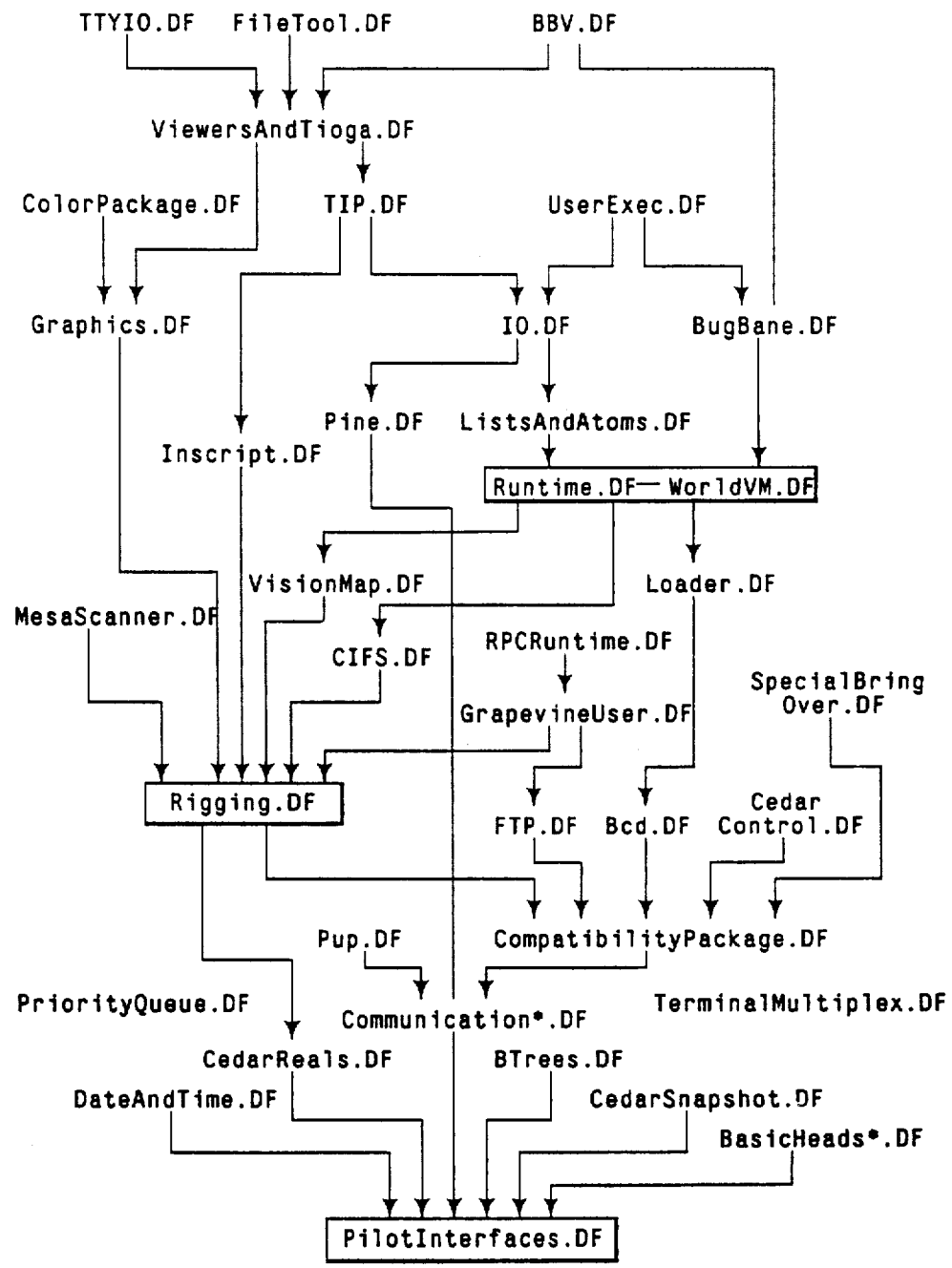
FIG. 11 is a dependency graph for interfaces.

An example for the dependency graph for interfaces is shown in FIG. 11. This graph indicates that the interfaces of CIFS, VersionMap, Runtime, WorldVM, ListsAndAtoms, and IO can be compiled in that order. This interface dependency graph had cycles in it in the Cedar release that have since been eliminated. Appendix A contains examaples of some of these DF files before and after the release.

Recompilation of all the interfaces in the boot file requires that at least nine programmer/users participate. Since the boot file cannot be produced until all interfaces and implementation modules in the DF files of FIG. 9 are compiled, interface changes are encouraged to be made as soon as possible after a successful release and only once per release. Once the users have made their interface changes and a boot file using the new interfaces is built, the normal period of testing can occur and new changes to implementation modules can be made relatively painlessly.

Figure 12:
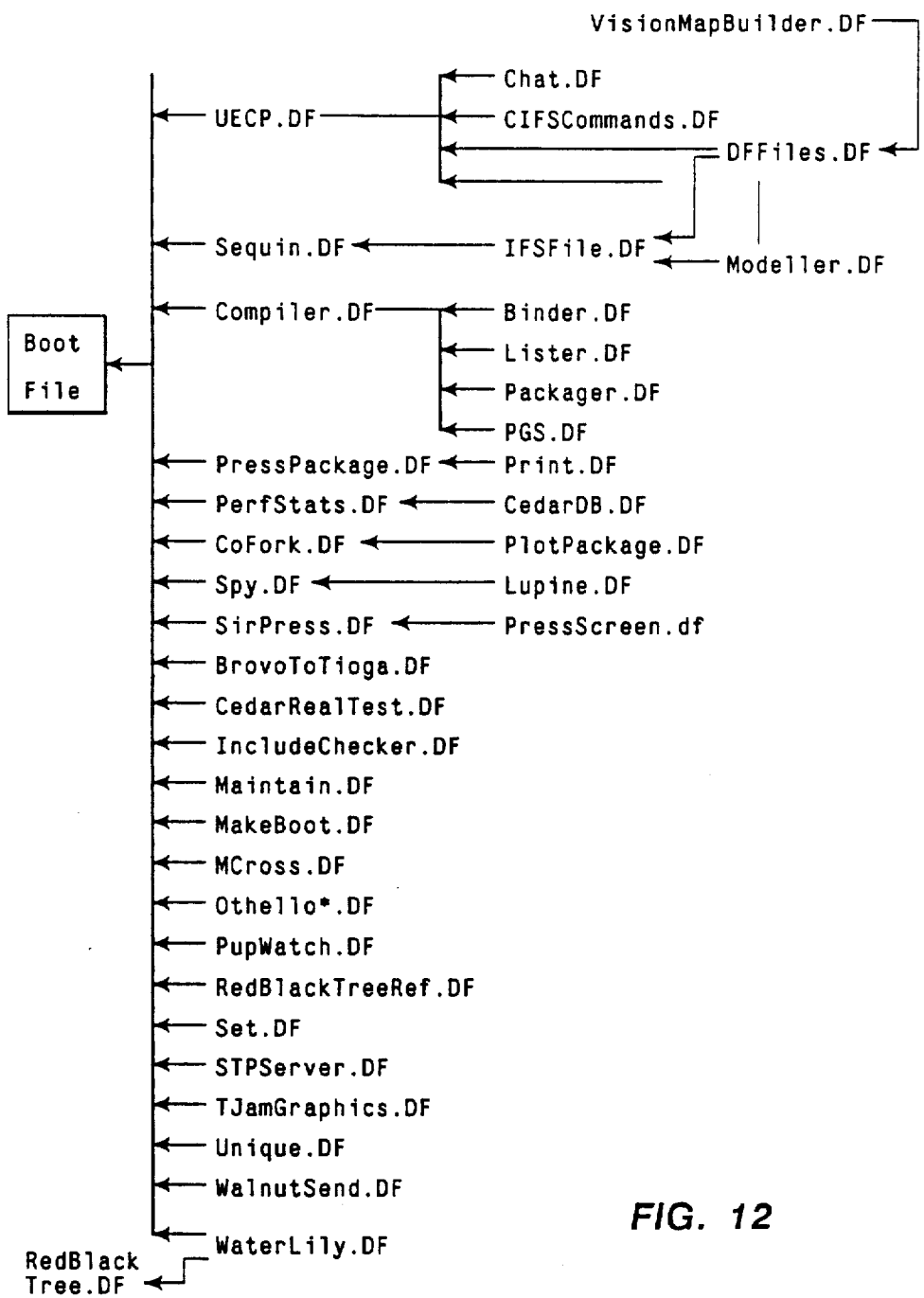
FIG. 12 is a dependency graph for files outside the boot file.

Components being released that are outside the boot file have a much simpler dependency structure, shown in FIG. 12. The majority of these components are application programs that use Cedar system facilities already loaded in the boot file.

The information in the DF files of a release help to permit study and planning for the development of the Cedar system. The ability to scan, or query, the interconnection information gives a complete view of the use of software by other programs in the system. For example, one can mechanically scan the DF files of an entire release and build a dependency graph describing the interfaces used in Cedar and which implementors depend on these interfaces. Since VerifyDF ensures all interfaces needed by a component are described in its DF file, an accurate database of information can be assured. This information can be used to evaluate the magnitude of changes and anticipate which components can be affected. One can also determine which interfaces are no longer used, and plan to eliminate the implementation of those interfaces, which happens often in a large programming environment while it is under active development.

The Cedar release/DF approach assumes only one person is changing a DF file at a time. How would we cope with more than one modifier of a package? If the package is easily divided, as with the Cedar system window manager and editor, two or more DF files can be included by an "umbrella" DF file that is released. One of the implementors must "own" the umbrella DF file and must make sure that the versions included are consistent by running VerifyDF check on the umbrella file. If the package is not easily divided, then either a check in/check out facility must be used on the DF and its contents to guarantee only one person is making changes at a time, or a merge facility would be needed to incorporate mutually exclusive changes. Should more than one programmer change the same module, this merge facility would have to ask for advice on which of the new versions, if any, to include on the DF file. 2. Module Interconnection Language—SML SML is a polymorphic and applicative language that is used to describe packages of Cedar modules. The programmer/user writes SML programs, which are called system models, to specify the modules in the system the user is responsible for and the interconnections between them. These system models are analyzed by a system modeller of the instant invention that automates the compile-edit-debug cycle by tracking changes to modules and performs the compilation and loading of systems.

The specification of module interconnection facilities of the Cedar system requires use of polymorphism, where the specification can compute a value that is later used as the type for another value. This kind of polymorphism is explained in detail later. The desire to have a crisp specification of the language and its use of polymorphism led to base SML on the Cedar Kernal language, which is used to describe the semantics of Cedar developed programs.

The semantics of the SML language have to be unambiguous so every syntactically-valid system model has clear meaning. The Cedar Kernal language has a small set of principles and is easily implemented. The clear semantics of Kermel language descriptions give a concise specification of the SML language and give good support to the needs of the module interconnection specification. SML could have been designed without reference to the Kernal language. However, without the Kernel language as a base, there would be less confidence that all language forms had clear meaning.

SML is an applicative language, since it has no assignment statement. Names or identifiers in SML are given values once, when the names are declared and the value of a name may not be changed later unless the name is declared in some inner scope. SML is easier to implement because it is applicative and function invocation has no side effects.

The fundamental concepts of SML are now presented, followed by a description of SML's treatment of files. The Cedar Kernal language, which serves as a basis for SML, is described, followed by a section on the syntax and semantics of SML expressions.

The Cedar System is based on the Mesa language see Mitchell et al., supra and Lauer et al., supra. The system contains features for automatic storage management (garbage collection) and allows binding of types at runtime, i.e. pointers to objects whose types are known only at runtime. The system derives from the Mesa language a rich module interconnection structure that provides information hiding and strong type checking at the module level, rather than at the procedure level. In order to better understand SML, it is important to know about the existing module interconnection facilities used in the Cedar system.

As previously indicated in part, a Cedar system consists of a set of modules, each of which is stored in a separate file. A module can be one of two types: an implementation (PROGRAM) module, or an interface (DEFINITIONS) module. Interface modules contain constants found in other Pascal-like languages: procedure declarations, type declarations, and other variables. A module that wishes to call a procedure declared in another module must do so by IMPORTing an interface module that declares this procedure. This interface module must be EXPORTED by a PROGRAM module. For example, a procedure "USortList" declared in a module "SortImpl" would also be declared in an interface Sort, and SortImpl would EXPORT Sort. A PROGRAM that wants to call the procedure USortList does so by IMPORTing Sort. We call the importer of Sort the "client" module and say SortImpl (the exporter) "implements" Sort. Of course, SortImpl may IMPORT interfaces to use that are defined elsewhere.

Figure 13A:
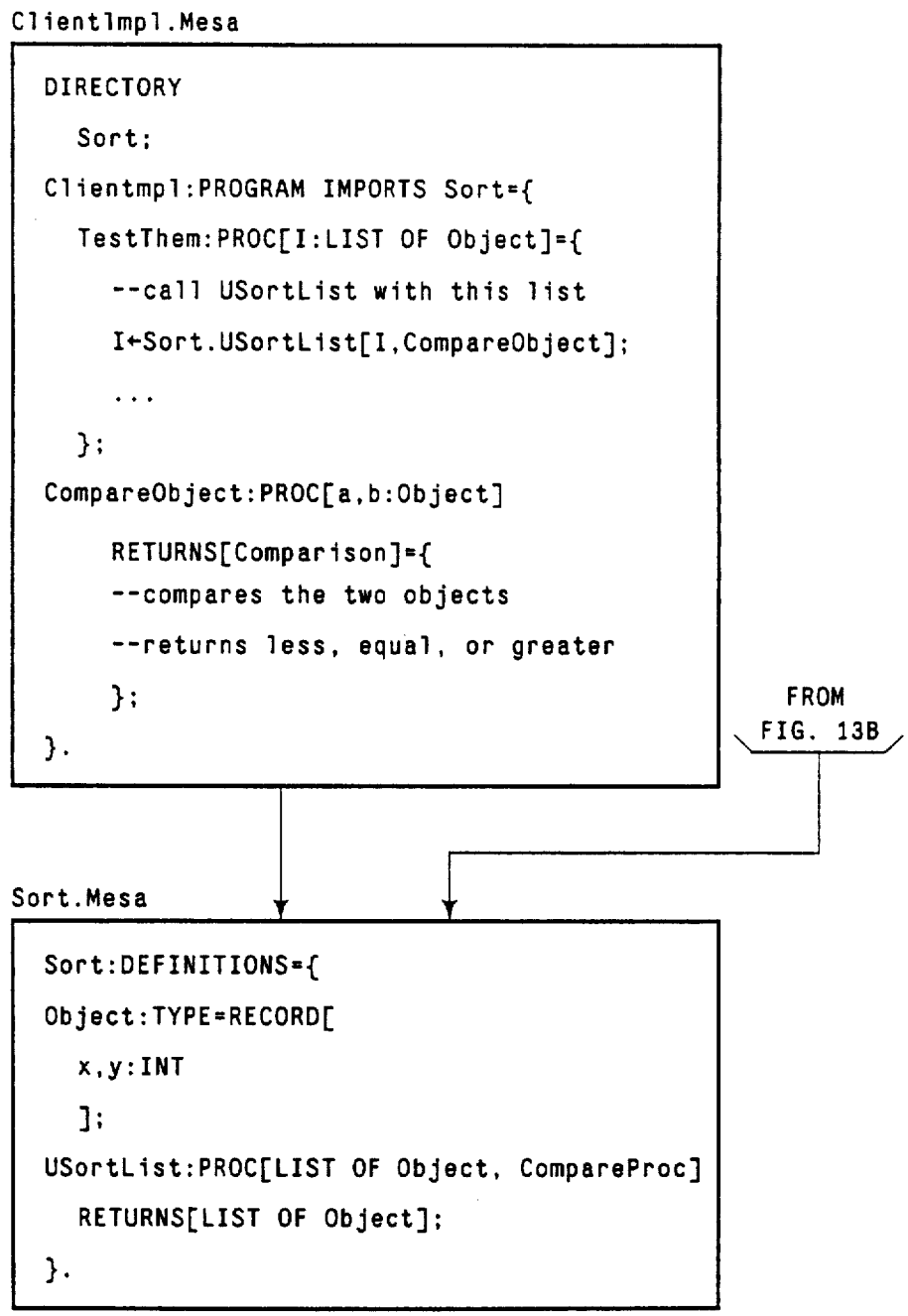
FIGS. 13a and 13b illustrate interconnections between implementation and interface modules.
Figure 13B:
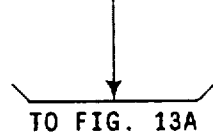

These interconnections are shown in FIG. 13, which shows filenames for each module in the upper left corner. The interface Sort defines an object composed of a pair of x,y coordinates. The EXPORTer, SortImpl.Mesa, declares a procedure that takes a list of these objects and sorts them, eliminating duplicates. LIST in the Cedar system is a built-in type with a structure similar to a Lisp list. ClientImpl.Mesa defines a procedure that calls USortList to sort a list of such objects. Details about "CompareProc" have been omitted for simplicity.

Most collections of modules in the system use the same version of interfaces, e.g., there is usually only one version of the interface for the BTree package in a given system. Situations arise when more than one version is used in a system. For example, there could be two versions of an interface to a list manipulation system, each one manipulating a different type of object.

FIG. 14 shows, on the left, the module from FIG. 13 and, on the right, another similar module that defines an "Object" to be a string instead of coordinates. A module that refers to the Sort interface would have to be compiled with one of the two versions of the Sort interface, since the compiler checks types of the objects being assembled for the sort. This is referred to as interface type parameterization since the types of items from the interface used by a client (ClientImpl.Mesa) are determined by the specific version of the interface (SortCoord.Mesa or SortNames.Mesa).

A different kind of parameterization may occur when two different implementations for the same interface are used. For example, a package that uses the left version of the Sort interface in FIG. 14 above might use two different versions of the module that EXPORTs Sort, one of which uses the QuickSort algorithm and the other uses the HeapSort algorithm to perform the sort. Such a package includes both implementors of Sort and must specify which sort routine the clients (IMPORTers) use when they call Sort.USortList[]. In the Cedar system, it is possible for a client module to IMPORT both versions, as shown in FIG. 15.

In FIG. 15, SortQuickImpl and SortHeapImpl both EXPORT different procedures for the Sort interface. One procedure, SortQuickImpl, uses QuickSort to sort the list. The other uses HeapSort to sort the list. The importer, ClientImpl, IMPORTS each version under a different name. SortQuickInst and SortHeapInst are called interface records, since they are represented as records containing pointers to procedures. The client procedure "TestThem" calls each in turn by specifying the name of the interface and the name of the procedure, e.g., SortQuickInst.USortList[].

How are the two interface records that are EXPORTED by SortQuickImpl and SortHeapImpl connected to the two interface records (SortQuickInst and SortHeapIInst) required by ClientImpl? A program called the Mesa Binder makes these connections by reading a specification written in a subset of Mesa called C/Mesa. C/Mesa source files, called CONFIGURATIONs, name the implementation modules involved and specify the interconnections. Below is shown the configuration that makes this connection:

```
ClientConfig: CONFIGURATION = {
    SQI: Sort ← SortQuickImpl[];
    SHI: Sort ← SortHeapImpl[];
    ClientImpl[SortQuickInst: SQI,
    SortHeapInst: SHI];
```

-continued

```
}.
```

Two variables are declared (SQI and SHI) that correspond to the interface records EXPORTED by the two modules. The client module is named, followed by the two interfaces given in keywork parameter notation.

This is called interface record parameterization, since the behavior of the client module is a function of which interfaces SortQuickInst and SortHeapInst refer to when they are called in ClientImpl.

C/Mesa, as currently defined, cannot express interface type parameterization at all. The semantics of some C/Mesa specifications are ambiguous. Because of this, the use of SML was choosen to replace the use of C/Mesa.

SML programs give the programmer/user the ability to express both kinds of parameterization. It is possible to think of SML as an extension of C/Mesa, although their underlying principles are quite different. Before explaining SML, reference is first made to an example of modules that use both interface type and interface record parameterization and show how this can be expressed in SML.

The essential features of SML are illustrated by the following simple model and are discussed later on relative to SML's treatment of files. A description of the SML language is also given later.

Consider two versions of the Sort interface from FIG. 14 and two EXPORTERs of Sort from FIG. 15. Since the EXPORTERs do not depend on the kind of object (coordinates or names), the EXPORTERs can each be constructed with a different type of object. Assume the client module wants to call USortList with all four combinations of object type and sort algorithm: (coordinates+quicksort, coordinates+heapsort, names+quicksort, names+heapsort). FIG. 16 shows a version of ClientImpl module that uses all four combinations of object type.

In SML, a model to express this is shown in Table II below.

TABLE II

| ClientModel ~ [ |
| --- |
| interface types |
| SortCoord: INTERFACE ~ @SortCoord.Mesa[]; |
| SortNames: INTERFACE ~ @SortNames.Mesa[]; |
| interface records |
| SQCI: SortCoord ~ @SortQuickImpl.Mesa[SortCoord]; |
| SQNI: SortNames ~ @SortQuickImpl.Mesa[SortNames]; |
| SHCI: SortCoord ~ @SortHeapImpl.Mesa[SortCoord]; |
| give all to client |
| Client: CONTROL ~ @ClientImpl.Mesa |
| [SortCoord.SortNames.SQCI, |
| SQNI,SHCI,SHNI] |
| ] |

SML allows names to given types and bound to values. After the header, two names "SortCoord" and "SortNames" are given values that stand for the two versions of the Sort interface. Each has the same type, since both are versions of the Sort interface. Their type is "INTERFACE Sort", where "INTERFACE" is a reserved word in SML and "Sort" is the interface name. The next four lines bind four names to interface records that correspond to the different sort implementations. "SQCI" is a name of type "SortCoord" and has as value the interface record with a procedure that uses Quick- Sort on objects with coordinates. Similarly, "SQNI" has as value an interface record with a procedure for QuickSort on objects with strings, etc. Note that each of the four implementations is parameterized by the correct interface, indicating which type to use when the module is compiled.

The last line specifies a name "Client" of reserved type "CONTROL" and gives it as value the source file for ClientImpl, parameterized by all the previously defined names. The first two, SortCoord and SortNames, are values to use for the names "SortCoord: INTERFACE Sort" and "SortNames: INTERFACE Sort" in the DIRECTORY clause of ClientImpl. The last four, in order, give interface records for each of the four imports.

There are a number of nearly-equal names in the example. If all related names were uniform, e.g., SortQuickCoordImpl instead of SQHI and SortQuickCoordInst, and SortHeapCoordImpl instead of SQHI and SortHeapCoordInst, then the parameter lists in the example could be omitted.

The kinds of values in SML follow naturally from the objects being represented: the value of "@ SortCoord.Mesa[]" is the object file for the interface module SortCoord.Mesa when it is compiled. The value of "@ SortQuickImpl.Mesa[]" is an interface record produced when the object file for SortQuickImpl.Mesa is loaded. Note there are two versions of the object file for SortQuickImpl.Mesa: one has been compiled with SortCoord as the interface it EXPORTs, and the other has been compiled with SortNames as the interface it EXPORTs.

It is helpful to differentiate the two types of parameterization by the difference in uses: Interface type parameterization is applied when a module is compiled and the types of the various objects and procedures are checked for equality. Interface record parameterization is applied when a module is loaded and the imports of other modules are resolved. The interface records by which a module is parameterized are used to satisfy these inter-module references.

The SML language is built around four concepts:
1. Application: The basic method of computing.
2. Values: Everything is a value, including types (polymorphism) and functions.
3. Binding: Correspondence between names and values is made by binding.
4. Groups: Objects can be grouped together.

Application

The basic method of computation in the SML language is by applying a function to argument values. A function is a mapping from argument values to result values.

A function is implemented either by a primitive supplied by the language (whose inner workings are not open to inspection) or by a closure, which is the value of a λ-expression whose body, in turn, consists of applications of functions to arguments. In SML, λ-expressions have the form $$\lambda[\text{free-variable-list}] \rightarrow [\text{returns-list}] \text{IN}[\text{body-expression}]$$

For example, a λ-expression could look like $$\lambda[x: STRING, y: STRING] \rightarrow [a: STRING] IN[exp]$$

where "x" and "y" are the free variables in the λ-expression, "a" is the name of the value returned when this λ-expression is invoked, and exp is any SML expression that computes a value for name "a". "IN" is like "." in standard λ-notation. It is helpful to think of a closure as a program fragment that includes all values necessary for execution except the λ's parameters, hence the term closure. Every λ-expression must return values, since the language has no side effects. Application is denoted in programs by expressions of the form $f[\text{arg, arg}, \ldots]$.

A SML program manipulates values. Anything that can be denoted by a name or expression in the program is a value. Thus strings, functions, interfaces, and types are all values. In the SML language, all values are treated uniformly, in the sense that any can be passed as an argument, bound to a name, or returned as a result.

These operations must work on all values so that application can be used as the basis for computation and λ-expressions as the basis for program structure. In addition, each particular kind or type of value has its own primitive functions. Some of these (like equality) are defined for most types. Others (like subscripting) exist only for specific types (like groups). None of these operations, however, is fundamental to the language.

There is a basic mechanism for making a composite value out of several simpler ones. Such a composite value is called a group, and the simpler ones are its components or elements. Thus [3, x+1, "Hello"] denotes a group, with components 3, x+1, and "Hello". The main use of groups is for passing arguments to functions without naming them. These are sometimes called positional arguments. Groups are similar to other language's "structures" or "records": ordered and typed sequences of values.

A binding is an ordered set of [name, type, value] triples, often denoted by a constructor like the following: [x: STRING ~ "s", y: STRING ~ "t"], or simply [x ~ "s", y ~ "t"]. Individual components can be selected from a binding using the "." operation, similar to Pascal record selection: binding.element yields the value of the component named "element" in binding.

A scope is a region of the program in which the value bound to a name does not change. For each scope there is a binding that determines these values. A new scope is introduced by a [...] constructor for a declaration or binding, or a LET statement illustrated below.

A declaration is an ordered set of [name, type] pairs, often denoted [x: STRING, y: STRING]. A declaration can be instantiated (e.g. on block entry) to produce a binding in which each name is bound to a name of the proper type. If d is a declaration, a binding b has type d if it has the same names, and for each name n the value b.n. has the type d.n.

In addition to the scopes defined by nested bindings, a binding can be added to the scope using a LET statement, $$\text{LET binding IN expr}$$

that makes the names in binding accessible in expr without qualification.

Every name has a type, either because the name is in a binding or the name is in a declaration. Names are given values using bindings. If a name is given an explicit type in the binding, the resulting value must have that type. For example, $$n: t \sim v$$

the type of "v" must be "t". Similarly, if "p" is a λ-expression with "a" as a free variable of type "STRING", then p[b]

type-checks if "b" has type "STRING".

There are no restrictions on use of type as values in SML. For example,

```
[n1: t ~ v1,
 n2: n1 ~ v2]
``` declares a name "n1" with a type t and a value v1, and then declares a name "n2" with type "n1" and value "v2". Although each such value can in turn be used as the type of another name, the modeller implementation does not attach semantics to all such combinations.

Strings are useful in a module interconnection language for compiler options and as components of file names. SML contains facilities to declare strings. For example, the binding

```
[x: STRING ~ "lit",
 y; STRING ~ x]
``` gives x and y the string literal value "lit".

SML describes software by specifying a file containing data. This file is named in SML by a filename proceded by an @. SML defines @ as source-file inclusion: The semantics of an @-expression are idential to those of an SML program that replaced the @ expression by its contents. For example, if the file inner.sm contained "lit"

which is a valid SML expression, the binding

```
[x: STRING ~ @inner.sm,
 y: STRING ~ @inner.sm]
and
[x: STRING ~ "lit",
 y: STRING ~ "lit"]
```

The @-expression is used in SML to refer to source modules. Although we cannot substitute the @-expression by the contents of the source file since it is written in C/Cedar, we treat the Cedar source file as a value in the language with a type. This type is almost always a procedure type. The values in SML that describe module interconnection are all obtained by invoking one of the procedure values defined by an @-expression.

When compiling a system module, all interfaces it depends on must be compiled first and the compiler must be given unambiguous references to those files. In order to load a module, all imports must be satisfied by filling in indirect pointers used by the microcode with references to procedure descriptors EXPORTed by other modules. Both kinds of information are described in SML by requiring that the user declare objects corresponding to an interface file (for compilation) or an interface record with procedure descriptors (for loading), and then parameterize module objects in SML as appropriate.

Consider an interface that depends on no other interfaces, i.e., it can be compiled without reference to any files. SML treats the file containing the interface as a function whose closure is stored in the file. The procedure type of this interface is for a procedure that takes no parameters and returns one result, e.g.,

[]→[INTERFACE Sort]

where "Sort" is the name of the interface, as in FIG. 13. The application of this λ-expression (with no arguments) will result in an object of type "INTERFACE Mod".

Id: INTERFACE Sort ~ @ Sort.Mesa[]

declares a variable "Id" that can be used for subsequent dependencies in other files. An interface "BTree" defined in the file "BTree.Mesa" that depends on an interface named "Sort" would have a procedure type like:

[INTERFACE Sort]→[INTERFACE BTree]

The parameters and results are normally given the same name as the interface type they are declared with, so the procedure type would be:

[Sort: INTERFACE Sort]→[BTree: INTERFACE BTree]

In order to express this in his model, the user would apply the file object to an argument list:

Sort: INTERFACE Sort ~ @ Sort.Mesa[];

BTree: INTERFACE BTree ~ @ BTree.Mesa[Sort];

These interfaces can be used to reflect other compilation dependencies.

An interface that is EXPORTed is represented as an interface record that contains procedure descriptors, etc. These procedures are declared both in the interface being EXPORTed and in the exporting PROGRAM module. One can think of the interface record as an instance of a record declared by the interface module. Consider the implementation module SortImpl.Mesa in FIG. 13. SortImpl EXPORTs an interface record for the Sort interface and calls no procedures in other SortImpl EXPORTs an interface record for the Sort interface and calls no procedures in other modules (i.e., has no IMPORTs). This file would have as procedure type:

[Sort: INTERFACE Sort]→[SortInst: Sort]

and would be used as follows:

Sort: INTERFACE Sort ~ @ Sort.Mesa[];

SortInst: Sort ~ @ SortImpl.Mesa[Sort];

which declares an identifier "SortInst" of the type "Sort", whose value is the interface record exported by SortImpl.Mesa. If SortImpl.Mesa imported an interface reocrd for "BTree," then the procedure type would be:

[Sort: INTERACE Sort, BTree: INTERFACE BTree. BTreeInst: BTree]→[SortInst: Sort]

and the exported record would be computed by:

SortInst: Sort~@ SortImpl.Mesa[Sort, BTree, BTreeInst]:

where [Sort, BTree, BTreeInstr] is a group that is matched to parameters of the procedure by position. Keyword matching of actuals to formals can be accomplished through a binding described later.

LET statements are useful for including definitions from other SML files. A set of standard Cedar interfaces could be defined in the file CedarDefs.Model:

```
[
    Rope: INTERFACE Rope ~ @Rope.Mesa,
    IO: INTERFACE IO ~ @IO.Mesa,
    Space: INTERFACE Space ~ @Space.Mesa
]
```

Then a LET statement like:

LET @ Cedar Defs.Model IN [expression]

is equal to:

```
LET [
    Rope: INTERFACE Rope ~ @Rope.Mesa,
    IO: INTERFACE IO ~ @IO.Mesa
    Space: INTERFACE Space ~ @Space.Mesa
] IN [expression]
``` and makes the identifiers "Rope", "IO", and "Scope" available within [expression].

SML syntax is described by the BNF grammar below. Whenever "x, ... " appears, it refers to 0 or more occurrences of x separated by commas. "|" separates different productions for the same non-terminal. Words in which all letters are capitalized are reserved keywords. Words that are all lower case are non-terminals, except for id, which stands for an identifier,
string, which stands for a string literal in quotes, and
filename, which stands for a string of characters that are legal in a file name, not surrounded by quotes.

Subscripts are used to identify specific non-terminals, so they can be referenced without ambiguity in the accompanying explanation.

```
exp ::= 1 [decl₁] → [decl₂] IN exp₁
      | let [binding] IN exp₁
      | exp₁ → exp₂
      | exp₁[exp₂]
      | exp₁ . id
      | [exp, ... ]
      | [decl]
      | [binding]
      | id
      | string
      | INTERFACE id
      | STRING
      | @filename
decl ::= id: exp, ...
binding ::= bindelem, ...
bindelem ::= [decl] ~ exp₁
           | id: exp₁ ~ exp₂
           | id ~ exp₁
```

A model is evaluated by running a Lisp-style evaluator on it. This evaluator analyzes each construct and reduces it to a minimal form, where all applications of closures to known values have been replaced by the result of the applications using β-reduction. The evaluator saves partial values to make subsequent compilation and loading easier. The evaluator returns a single value, which is the value of the model, usually a binding.

The semantics for the productions are:

$$exp::=\lambda[decl_1]\rightarrow[decl_2]IN\ exp_1$$

The expression is a value consisting of the parameters and returned names, and the closure consisting of the expression $exp_1$ and the bindings that are accessible statically from exp. The type is "$decl_1 \rightarrow decl_2$". The value of this expression is similar to a procedure variable in conventional languages, which can be given to other procedures that call it within their own contexts. The closure is included with the value of this expression so that, when the λ-expression is invoked, the body ($exp_1$) will be evaluated in the corect environment or context.

$$exp::=LET\ [binding]IN\ exp_1$$

The current environment of $exp_1$ is modified by adding the names in the binding to the scope of $exp_1$. The type and value of this expression are the type and value of $exp_1$.

$$exp::=exp_1\rightarrow exp_2$$

The value of exp is a function type that takes values of type $exp_1$ and returns values of type $exp_2$.

$$exp::=exp_1[exp_2]$$

The value of $exp_1$, which must be a closure, is applied to the argument list $exp_2$ as follows. A binding is made for the values of the free variables in the λ-expression. If $exp_2$ is a group, then the components of the group are matched by type to the formals of the λ-expression. The group's components must have unique types for this option. If $exp_2$ is a binding then the parameters are given values using the normal binding rules to bind $f \sim exp_2$ where $exp_2$ is a binding and f is the decl of the λ-expression.

There are two cases to consider:

1. The λ-expression has a closure composed of SML expressions. This is treated like a nested function. The evaluation is done by substitution or β-reduction: All occurrences of the parameters are replaced by their values. The resulting closure is then evaluated to produce a result binding. The λ-expression returns clause is used to form a binding on only those values listed in the λ-expression returns list, and that binding is the value of the function call.

2. If the function being applied is a Cedar source or object file, the evaluator constructs interface types of interface records that correspond to the interface module or to the implementation module's exported interfaces, as appropriate. After the function is evaluated, the evaluator constructs a binding between the returned types in its procedure type and the values of the function call.

$$exp::=[exp,\ ...\ ]$$

The $exp_1$ is evaluated and must be a binding. The component with name "id" is extracted and its value returned. This is ordinary Pascal record element selection.

exp::= [exp, ... ]

A group of the values of the component exp's is made and returned as a value.

exp::= [decl]

decl::= id:exp, ...

Adds names "id" to the current scope with type equal to value of exp. A list of decls is a fundamental object.

```
exp :: = [binding]
binding :: = bindelem, ...
bindelem :: = [decl] ~ exp₁
            | id: exp₁ ~ exp₂
            | id ~ exp₁
```

A bindelem binds the names in decl to the value of expl. If an id is given instead of a decl, the type of id is inferred from that of $exp_1$. The binding between the names in decl and the values in $exp_1$ follows the same rules as those for binding arguments to parameters of functions.

exp::= id id stands for an identifier in some binding (i.e., in an enclosing scope). The value or id is its current binding.

exp::= string

A string literal like "abc" is a fundamental value in the language.

exp::= INTERFACE id

This fundamental type can be used as the type of any module with module name id. Note id is used as a literal, not an identifier, and its current binding is irrelevant. The value of this expression is the atom that represents "INTERFACE id".

exp::= STRING

A fundamental type in the language. The value of "STRING" is the atom that represents string types.

exp::= @ filename

This expression denotes an object whose value is stored in file filename. If the file is another model, then the string @ filename can be replaced by the content of the file. If it is another file, such as a source or object file, it stands for a fundamental object for which the evauator must be able to compute a procedure type.

Function calls in SML are made by applying a closure to (1) a group or (2) a binding. If the argument is a group, the parameters of the closure are matched to the components by type, which must be unique. If the argument is a binding, the parameters of the closure are matched by name with the free variables. For example, if p is bound to:

p~λ[x: STRING, y: INTERFACE Y]→[Z: INTERFACE Z]IN[ ... ]

then p takes two parameter, which may be specified as a group:

```
[
defs: INTEFACE Y ~ @Defs.Mesa[],
z: INTERFACE Z ~ p["lit", Defs]
]
``` where the arguments are matched by type to the parameters of the closure. The order of "lit" and Defs in the example above does not matter. Also the order of x and y in the call of p in the example does not matter. The function may also be called with a binding as follows:

```
[
defs: INTERFACE Y ~ @Defs,Mesa[],
z: INTERFACE Z ~ p[x ~ "lit", y ~ Defs]
]
``` which corresponds to keyword notation in other programming languages.

Since the parameter lists for Cedar modules are quite long, the SML language includes defaulting rules that allow the programmer to omit many parameters. When a parameter list, either a group or a binding, has too few elements, the given parameters are matched to the formal parameters and any formals not matched are given default values. The value for each defaulted formal parameter is the value of a variable defined in some scope enclosing the call with the ame name and type as the formal. Therefore, the binding for Z in:

```
[
x: STRING ~ "lit",
y: INTERFACE Y ~ @Defs.Mesa[],
z: INTERFACE Z ~ p[]
]
``` is equivalent to "p[x. y]" by the equal-name defaulting rule.

SML also allows projections of closures into new closures with parameter. For example,

```
[
Y: INTERFACE Y ~ @Defs.Mea[],
pl:[Y: INTERFACE Y] ← [Z: INTERFACE Z] ~ p["lit"],
Z: INTERFACE Z ~ pl[Y]
]
``` sets Z to the same value as before but does it in one extra step by creating a procedure value with one fewer free variable, and then applied the procedure value to a value for the remaining free variable. The defaulting rules allow parameter to be omitted when mixed with projections:

```
[
X: STRING ~ "lit",
Y: INTERFACE Y ~ @Defs.Mesa[],
pl: [Y: INTERFACE Y] → [Z: INTERFACE Z] ~ p[],
Z: INTERFACE Z ~ pl[]
]
```

Enough parameters are defaulted to produce a value with the same type as the target type of the binding (the type on the left side of the notation, "~"). When the type on the left side is omitted, the semantics of SML guarantee that all parameters are defaulted in order to produce result values rather than a projection. Thus $$Z \sim p1[]$$

in the preceding examples declares a value Z of type INTERFACE Z and not a projection whose value is a λ-expression. These rules are stated more concisely below.

If the number of components is less than those required to evaluate the function body, a coercion is applied to produce either (1) the complete argument list, so the function body may be evaluated, or (2) a projection of the original λ-expression into a new λ-expression with fewer free variables. If the type of the result of "exp$_1$[exp$_2$]" is supplied, one of (1) or (2) will be performed. When the target type is not given, e.g., $$x \sim proc[Y]$$

case (1) is assumed and all parameters of "proc" are assumed defaulted. For example, the expression:

proc: [Y: STRING, Z: STRING]→[r: R], x: T~proc[Y]

binds the result of applying proc to Y to x of type T. If T is a simple type (e.g., "STRING"), then the proc[Y] expression is coerced into proc[YU, Z], where Z is the name of the omitted formal in the λ-expression and R must equal T. If Z is undefined (has no binding) an error has occurred and the result of the expression is undefined. If T is a function type (e.g., [Z: STRING]→[r: R]), then a new closure is replaced by tghe value of Y. This closure may be subsequently applied to a value of Z and the result value can be computed. The type of Z must agree with the parameters of the target function type.

The SML evaluator is embedded in a program management system that separates the functions of file retrieval, compilation, and loading of modules. Each of these functions is implemented by analyzing the partial values of the evaluated SML expression. For example, the application of a file to arguments is analyzed to see whether compilation or loading is required. For each of these phases, the evaluator could be invoked on the initial SML expression, but this would be inefficient. Since the SML language has no iteration constructs and no recursively-defined functions, the evaluator can substitute indirect references to SML expressions through @-expressions by the file's contents and can expand each function by its defining expression with formals replaced by actuals.

This process of substitution must be applied recursively, as the expansion of a λ-expression may involve expansion of inner λ-expressions. The evaluator does this expansion by copying the body of the λ-expression, and then evaluating it using the scope in which the λ-expression was defined after adding the actual parameters as a binding for the function to the scope.

The scope is maintained as a tree of bindings in which each level corresponds to a level of binding, a binding added by a LET statement, or a binding for parameters to a λ-expression.

Bindings are represented as lists of triples of name, type, value. A closure is represented as a quadruple comprising "list of formals, list of returns, body of function, scope printer", where the scope pointer is used to establish the naming environment for variables inside the body that are not formal parameter. The @-expression is represented by an object that contains a pointer to the disk file named. A variable declared as INTERFACE mod (i.e., an interface type variable), is represented as a "module name, pointer to module file" pair, and a variable given as type and interface type variable, i.e., an interface record variable, is repreented as a "pointer to procedure descriptors, pointer to loaded module".

The substitution property of Russell, discussed in the Article of A. Demers et al., "Data Types, Parameters & Type Checking", Proceedings of the Seventh Symposium on Principles of Programming Languages, Las Vegas, Nev., pp. 12-23, 1980, guarantees that variable-free expressions can be replaced by their values without altering the semantics of Russell programs. Since SML programs have no variables and allow no recursion, the substitution property holds for SML programs as well. This implies that the type-equivalence algorithm for SML programs always terminates, since the value of each type can always be determined statically.

The following are two further examples of models described in SML.

EXAMPLE 1

The B-tree package consists of an implementation module in the file "BTreeImpl.Mesa" and an interface "BTree.Mesa" that BTreeImpl EXPORTS. There is no client of BTree, so this model returns a value for the interface type and record for BTree. Some other model contains a reference to this model and a client for that interface. The BTree interface uses some constants found in "Ascii.Mesa", which contains names for the ASCII chaacter set. The BTreeImpl module depends on the BTree interface since it EXPORTs it and makes use of three standard Cedar interfaces. "Rope" defines procedures to operate on immutable, garbage collected strings. "IO" is an interface that defines procedures to read and write formatted data to a stream, often the user's computer terminal. "Space" defines procedures to allocate Cedar virtual memory for large objects, in this case the B-tree pages.

```
-- Exl.Model
LET [
Rope: INTERFACE Rope ~ @Rope.Bcd,
IO: INTERFACE IO ~ @IO.Bcd,
Space: INTERFACE Space ~ @Space.Bcd,
] IN
BTreeProc ~
λ[RopeInst: Rope, IOIsnt:]O, SpaceInst: Space]
→ [BTree: INTERFACE BTree, BTreeInst: BTree]
IN [
Ascii: INTERFACE Ascii ~ @Ascii.Mesa
BTree: INTERFACE BTree ~ @Btree[Ascii],
BTreeInst: BTree ~]@BTreeImpl.Mesa[BTree, Rope,]O.Space,
RopeInst, IOInst. SpaceInst]
]
```

This model, stored in the file "Exl.Model", describes a BTree system composed of an interface "BTree" and an implementation for it. The first three lines declare three names used later. Since they are given values that are object or binary (.bcd) files, they take no parameters. This model assumes those files have already been compiled. Note they could appear as:

Rope ~ @Rope.Bcd,

IO ~ @IO.Bcd,

Space ~ @Space.Bcd since the types of the three identifiers can be determined from their values. The seventh line binds an identifier "BTreeProc" to a λ-expression with three interface records as parameters. If those are supplied, the function will return (1) an interface type for the BTree system, and (2) an interface record that has that type. Within the body of the closure of the λ-expression, there are bindings for the identifiers "Ascii", "BTree", and "BTreeInst". In all cases, the type could be omitted as well.

The file "Exl.Model" can be evaluated. Its value will be a binding of BTreeProc to a procedure value. The value is a λ-expression that must be applied to an argument list to yield its return values. Another model might refer to the BTree package by:

[BTree.
 BTreeInst] ~ @Exl.Model).BTreeProc[RopeInst,
 IOInst, SpaceInst]

EXAMPLE 2

---
— CedarDefs.Model
[
Rope: INTERFACE Rope ~ @Rope.Bed,
IO: INTERFACE IO ~ @IO.Bed.
Space: INTERFACE Space ~ @Space.Bed
]
— BTree.Model
Let @CedarDefs.Model IN[
BTreeProc ~
λ[RopeInst: Rope, IOIsnt:]O, SpaceInst: Space]
→ [BTree: INTERFACE BTree. BTreeInst: BTree]
IN[
Ascii: INTERFACE Ascii ~ @Ascii.Mesa.
BTree: INTERFACE BTree ~ @BTree[Ascii],
BTreeInst: BTree ~ @BTreeImpl.Mesa[BTree, Rope,]O, Space,
RopeInst,]OInst, SpaceInst]
]
]
---

The prefix part is split into a separate file. The BTree.Model file contains (1) a binding that gives a name to the binding in CedarDefs. Model, and (2) a LET statement that makes the values in CedarDefs.-Model accessible in the λ-expression of BTree.Model.

Dividing Example 1 into two models like this allows us to establish standard naming environments, such as a model that names the commonlyused Cedar interfaces. Programmer/users are free to redefine these names with their models if they so desire.

3. System Modeller—Software Version Management System

The System modeller is a complete software development system which uses information stored in a system model, which describes a software system in the environment, e.g., the Cedar system, by specifying:

1. The versions of various modules that make up a particular software system.

2. The interconnections between modules, such as which procedures are used and where they are defined.

3. Additional information needed to compile and load the system.

4. Hints for locating the modules in a distributed file system.

Under the direction of the user or programmer, the modeller performs a variety of operations on the systems described by the system models:

1. It implements the representation of the system by source text in a collection of files.

2. It tracks changes made by the programmer. To do this, it is connected to the system editor and is notified when files are edited and new versions are created.

3. It automatically builds an executable version of the system, by recompiling and loading the modules. To provide fast response, the modeller behaves like an incremental complier: only those modules that change are analyzed and recompiled.

4. It provides complete support for the integration of packages as part of a release.

Thus, the modeller can manage the files of a system as they are changing, providing a user interface through which the programmer edits, compiles, loads and debugs changes interactively while developing software. The models are automatically updated to refer to the changed components. Manual updates of models by the programmer are, therefore, not normally necessary.

The programmer writes a model in SML notation for describing how to compose a set of related programs from their components. The model refers to a component module of the program by its unique name, independently of the location in the file system where its bits are stored. The development of a program can be described by a collection of models, one for each stage in the development; certain models define releases.

As previously indicated, SML has general facilities for abstraction. These are of two kinds:

(1) A model can be organized hierarchially into parts, each of which is a set of named sub-parts called a binding. Like the names of files in a directory, the names in a binding can be used to select any desired part or parts of the binding.

(2) A model can be parameterized, and several different versions can be constructed by supplying different arguments for the parameters. This is the way that SML caters for planned variation in a program.

The distributed computing environment means that files containing the source text of a module can be stored in many places. A file is accessed most efficiently if it happens to be on the programmer's own machine or computer. Remote files must first be located and then retrieved. The modeller imposes minimal requirements on the capabilities of the distributed file system. In fact, it requires only that there be a way to enumerate the versions of a particular file in a remote directory, and to store or retrieve an entire remote file. When possible, it caches information about a module, such as its dependencies on other modules, to avoid retrieving the entire module and parsing its text. It also caches the complete path names of objects to avoid searches in remote directories.

When invoked, the modeller uses the objects in a model to determine which modules need to be recompiled. The modeller will get any files it needs and try to put the system together. Since it has unique-ids for all the needed sources, it can check to see if they are nearby. If not, it can take the path name in the model as a hint and, if the file is there, it can be retrieved. The modeller may have difficulty retrieving files, but it will not retrieve the wrong version. Having retrieved as many files as possible, it will compile any source files if necessary, load the resulting binary files, and run the program.

A model normally refers to source files rather than the less flexible binary or object files produced by the compiler, whose interface types are already bound. The system modeller takes the view that these binary files are just accelerators, since every binary file can be compiled using the right source files and parameters. The model has no entry for a binary file when the source file it was compiled from is listed. Such an entry is unnecessary since the binary file can always be reconstructed from the source. Of course, wholesale recompilation is time consuming, so various databases are used to avoid unnecessary recompilation.

Models refer to objects, i.e., source or binary (object) files or other models, using an @-sign followed by a host, directory, and file name, optionally followed by version information. In a model, the expression, @[Indigo]<Cedar>X.Mesa!(July 25, 1982 16:10:09)

refers to the source version of X.Mesa created on July 25, 1982 16:10:09 that is stored on file server [Indigo] in the directory <Cedar>. The !( . . . ) is not part of the file name but is used to specify explicitly which version of the file is present. The expression, @[Indigo]<Cedar>X.Bcd!(1AB3FBB462BD)

refers to the binary or object version of X.Bcd on [Indigo]<Cedar>X.Bcd that has a 48-bit version stamp "1AB3FBB462BD" (hexadecimal). For cases when the user wants the most recently-saved version of X.Mesa or X.Bcd, @[Indigo]<Cedar>X.Mesa!H refers to the most recently stored version of X.Mesa on [Indigo<Cedar>. This "!H" is a form of implicit parameterization. If a model containing such a reference is submitted as part of a software release, this reference to the highest version is changed into a reference to a specific version.

The system modeller takes a very conservative approach, so the users can be sure there is no confusion on which versions have been tested and are out in the field of the distributed software system.

What happens, however, when a new version $V_2$ of an object is created? In this view, such a version is a new object. Any model $M_1$ which refers to the old object $V_1$ continues to do so. However, it is possible to create a new model $M_2$ which is identical to $M_1$ except that every reference to $V_1$ is replaced by a reference to $V_2$. This operation is performed by the modeller and called Notice. In this way, the notion that objects are immutable is reconciled with the fact of evolution.

With these conventions, a model can incorporate the text of an object by using the name of the object. This is done in SML expression by writing an object name preceded by sign "@". The meaning of an SML expression containing an @-expression is defined to be the meaning of an expression in which the @ expression is replaced by its contents. For example, if the object inner.model contains "lit"

which is an SML expression, the binding

[x:STRING ~ @inner.sm,
y:STRING ~ "lit"]

has identical values for x and y.

With these conventions, a system model is a stable, unambiguous representation for a system. It is easily transferred among programmers and file systems. It has a readable text representation that can be edited by a user at any time. Finally, it is usable by other program utilies such as cross-reference programs, debuggers, and optimizers that analyze intermodule relationships.

The modeller uses the creation date of a source object as its unique identifier. Thus, an object name might have the form BTree.Cedar!(July 22, 1982 2:23:56); in this representation the unique identifier follows the "!" character.

For a derived object such as a binary module, the modeller uses a 48-bit version stamp which is constructed by hashing the name of the source object, the compiler version and switches, and the version stamps of any interfaces which are parameters of the compilation. In this way, derived objects constructed at different times will have the same names, as long as they are made in exactly the same way. This property can make a considerable difference in the time required to rebuild a system when some binary modules must be rebuilt, especially if there are other modules which depend on the ones being rebuilt.

It is also possible to use an ambiguous name for an object, such as in the form, BTree.cedar!H. This means to consider all the objects whose names begin BTree.cedar, and take the one with the most recent create date.

As previously explained, Cedar programing consists of a set of modules. There is included two kinds of modules: implementation (PROGRAM) modules, and interface (DEFINITIONS) modules. An interface module contains constants (numbers, types, inline procedures, etc.) and declarations for values to be supplied by an implementation (usually procedures, but also types and other values). A module $M_1$ that calls a procedure in another module $M_2$ must IMPORT an instance Inst of an interface I that declares this procedure. Inst must be EXPORTED by the PROGRAM module $M_2$. For example, a procedure Insert declared in a module BTreeImpl would also be declared in an interface BTree, and BTreeImpl would EXPORT an instance of BTree. A PROGRAM calls Insert by IMPORTing this instance of BTree and referring to the Insert component of the instance. The IMPORTer of BTree is called the client module, and BTreeImp, the EXPORTer, implements Btree. Of course BTreeImpl may itself IMPORT and uses interfaces that are defined elsewhere.

FIG. 17 discloses a very simple system model called BTree, which defines one interface BTree and one instance BTreeInst of BTree.

BTree.model in FIG. 17 refers to two modules, BTree.cedar!(Sept. 9, 1982, 13:52:55) and BTreeImpl.cedar!(Jan. 14, 1983 14:44:09). Each is named by a user-sensible name (e.g., BTree.cedar), pat of which identifies the source language as Cedar, and a creation time (e.g. !(Sept. 9, 1982, 13:52:55)) to ensure uniqueness. The @ indicates that a unique object name follows. Each object also has a file location hint, e.g., ([Ivy]<Schmidt>, i.e., file server, Ivy, and the directory, Schmidt).

BTree.model refers to two other models, CedarInterfaces.model!(July 25, 1982, 14:03:03) and CedarInstances.model!(July 25, 1982, 14:10:12). Each of these is a binding which gives names to four interface or instance modules that are part of the software system. A clause such as LET CedarInterfaces.model IN . . .

makes the names bound in CedarInterfaces (Acii, Rope, IO, Space) denote the associated values (Ascii.cedar!(July 10, 1982, 12:25:00)[], etc.) in the expression following the IN.

Models denote dependency by parameterization. There are two kinds of dependency: on interfaces, and on implementations, or instances of the interfaces. Correspondingly, each source module is viewed as a function which takes interface arguments and returns another function which takes instance argument. Applying the first function to its interface arguments is done by the compiler; applying the resulting second function to its instance arguments is done by the loader as it links up definitions with uses.

In the example of FIG. 17, the BTree interface depends on the Ascii interface from CedarInterfaces. Since it is an interface, it does not depend on any implementations. BTreeImpl depends on a set of interfaces which the model does not specify in detail. The "*" in front of the first parameter list for BTreeImpl means that its arguments are defaulted by name matching from the system environment. In particular, it probably has interface parameters BTree, Rope, IO, and Space. All these names are defined in the environment, BTree explicitly and the others from CedarInterfaces through the LET clause, BTreeImpl also depends on Rope, IO and Space instances from CearInstances, as indicated in the second argument list.

The interface parameters are used by the compiler for type-checking, and so that details about the types can be used to improve the quality of the object code. The instance parameters are used by the loader and they specify how procedures EXPORTed by one module should be linked to other modules which IMPORT them.

A. User Interface

I. General

The system modeller provides an interactive interface for ordinary incremental program development. When used interactively, the role of the modeller is similar to that of an incremental compiler; it tries to do as little work as it can as quickly as possible in order to produce a runnable system. To do this, it keeps track incrementally of as much information as possible about the objects in the active models under use.

For example, consider the following Scenario. Assume a model already exists, say BTree.model, and a user wants to change one module to fix a bug (code error). Earlier, the user has started the modeller with BTree.model as the current model. The user uses the system editor to make a change to BTreeImpl.cedar!(Jan 14, 1983 14:44:09). When the user finishes editing the module and creates a new version BTreeImpl.cedar!(Apr. 1, 1983, 9:22:12), the editor notifies the modeller by calling its Notice procedure, indicating the BTreeImpl.cedar!(Apr. 1, 1983, 9:22:12) has been produced from BTreeImpl.cedar!(Jan. 14, 1983, 14:44:09). If the latter is referenced by the current model, the modeller notices the new version and updates BTree.model!(Jan. 14, 1983, 14:44:11) to produce BTree.model!(Apr. 1, 1983, 9:22:20), which refers to the new version. The user may edit and continue to change more files. When the user wants to make a runnable version of the system, upon command to the modeller, which then compiles everything in correct order and, if there are no errors, produces a binary file.

A more complex scenario involves the parallel development of the same system by two programmers. Suppose both start with a system described by the model $M_0$, and end up with different models $M_1$ and $M_2$. They may wish to make a new version $M_3$ which merges their changes. The modeller can provide help for this common case as follows: If one programmer has added deleted or changed some object not changed by the other, the modeller will add, delete, or change that object in a merged model. If both programmers have changed the same object in different ways, the modeller cannot know which version to prefer and will either explore the changed objects recursively, or ask the user for help.

More precisely, we have $$M_3 = \text{Merge}[\text{Base} \sim M_0, \text{New}_1 \sim M_1, \text{New}_2 \sim M_2]$$

and Merge traces out the three models depth-first. At each level, for a component named p:

| If | Add to result |
| --- | --- |
| Base.p=M1.p=M2.p | Base.p |
| Base.p=M$_1$.p≠M2/1.p | M$_{2/1}$.p |
| Base.p=M$_1$.p, no M2/1.p | leave p out |
| no Base.p or M$_1$.p | M$_{2/1}$.p |
| Base.p≠M$_1$.p≠M$_2$.p, all models | Merge[Base.p:,M$_1$.p,M$_2$.p] |
| ELSE | error, or ask what to do. |

At all points, the modeller maintains a model that describes the current program. When a user makes a decision to save a module or program, this is accomplished by an accurate description in the model. Since the models are simply text files, the user always has the option of editing the model as preferred, so the modeller does not have to deal with specifically obscure special cases of editing.

Figure 20:
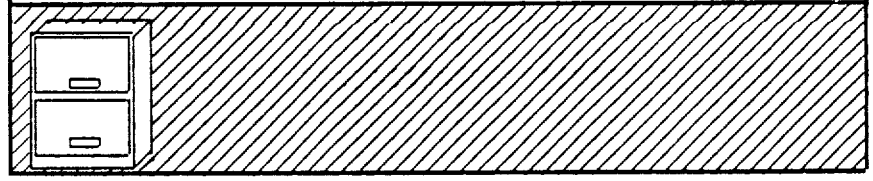
FIG. 20 is an illustration the user's screen for system modeller in the Cedar system.

In a session which is part of the daily evolution of a program of software system, the user begins by creating an instance of the modeller, which provides a window on the user's screen, as shown in FIG. 20, in this case being that of the Cedar environment. The following explanation and subsequent sections to follow give an overview of its use, suggested by the contents of the Figure per se.

The modeller window is divided into four fields, which are, from top to bottom: (1) A set of screen initiated names in field 30 that function as buttons to control the modeller, (2) A field 32 where object names may be typed, (3) A feedback field 34 for compiler progress messages, and (4) A feedback field 36 for modeller messages.

Figure 21:
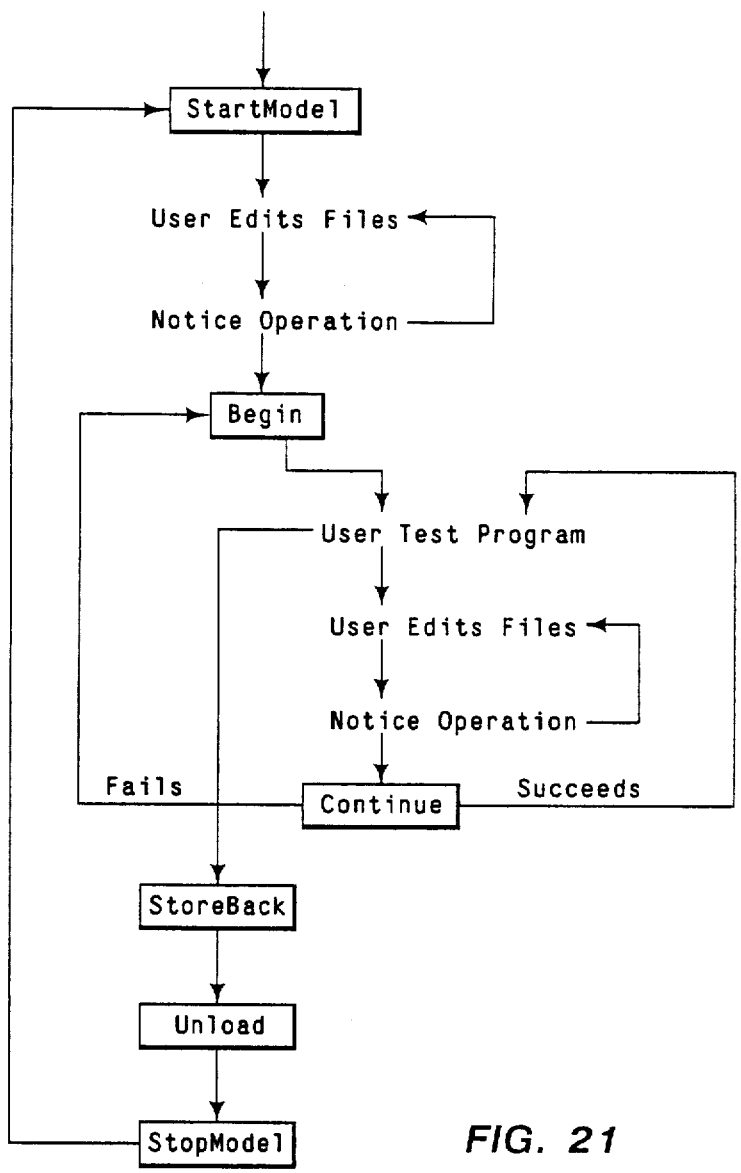
FIG. 21 is a flow diagram illustrating the steps the user takes in employing the system modeller.

To aid in the explanation modeller, the following example follows the steps the user performs to use the modeller. These steps are illustrated in the flow diagram of FIG. 21.

Step 1. Assume that the modeller instance has just been created. The user decides to make changes to the modules in Example.Model. The name of the model is entered in the field 32 following the "ModelName:" prompt, and initiates the StartModel button in field 30. From this point on the modeller is bound to Example.-Model. StopModel in field 30 must be initiated before using this instance of the modeller on another model. StartModel initializes data structures in this instance of the modeller, StopModel frees the data.

Step 2. The user makes changes to objects on the user's personal machine or computer. The system editor calls the modeller's Notice procedure to report that a new version of an object exists. If the object being edited is in the model, the modeller updates its internal representation of the model to reflect the new version. If the changes involve adding or deleting parameters to modules, the modeller uses standard defaulting rules to modify the argument list for the object in the model.

Step 3. Once the user has made the intended edits, the user initiates Begin in field 30, which (a) recompiles modules as necessary, (b) loads their object files into memory, and (c) forks a process that starts the user's program running. Modules need to be recompiled if the corresponding source files have been changed, or if any modules they depend on have been compiled. Should (a) or (b) encounter errors, the modeller does not proceed to (c).

Step 4. After testing the programs, the user may want to make changes simple enough that the old module may be replaced by the new module without re-loading and restarting the system. If so, after editing the modules, the user initiates "Continue" in field 30, which tries to replace modules in the already loaded system. If this is successful, the user may proceed with the testing of the program and the new code will be used. If the module is not replaceable, the user must initiate "Begin" in field 30, which will unload all the old modules in this model and load in the new modules.

Step 5. After completing desired changes, the user can initiate "StoreBack" in field 30 to store copies of his files on remote file servers, and then initiate "Unload" to unload the modules previously loaded, and finally initiate "StopModel" to free modeller data structures.

The following is a more further explanation of some of the field 30 initiated functions.

StartModel: The modeller begins by reading in the source text of a model and buiding an internal tree structure traversed by subsequent phases. These phases use this tree to determine which modules must be compiled and loaded and in what order. Since parameters to files may have been defaulted, the modeller uses a database of information about the file to check its parameterization in the model and supply defaults, if necessary. If the database does not have an entry for the version of the file listed in the model, the modeller will read the file and analyze it, adding the parameterization information to the database for future reference. This database is described later.

Notice Operation: The system editor notifies a modeller running on the machine when a new version of a file is created. The modeller searches its internal data structure for a reference to an earlier version of the file. If one is found, the modeller changes the internal data structure to refer to the new version.

While making edits to modules, users often alter the parameterization of modules, i.e., the interface types and IMPORTed interface records. Since editing the model whenever this happens is time-consuming, the modeller automatically adjusts the parameterization, whenever possible, by using the defaulting rules of the modelling language: If a parameter is added and there is a variable with the same name and type as the new parameter, that variable is used for the actual parameter. If a parameter is removed, then the corresponding actual parameter is removed. The modeller re-parses the header of a "noticed" module to determine the parameters it takes.

Some changes made by the user cannot be handled using these rules. For example, if the user changes a module so that it IMPORTs an interface record, and there is no interface record in the model with that name, the modeller cannot known which interface record was intended. Similarly, if the user changes the module to EXPORT a new interface record, the modeller cannot know what name to give the EXPORTed record in the model. In these situations, the user must edit the model by hand to add this information and start the modeller again on the new version of the model.

Compilation and Loading: After the user initiates "Begin," the modeller uses the internal data structure as a description of a software system the user wants to run on the particular machine. To run the system, each module must have been compiled, then loaded and initialized for execution. The modeller examines each module using the dependency graph implied by the internal data structure. Each module is compiled in correct compilation order if no suitable object file is available. Modules that take no parameters are examined first, then modules that depend on modules already analyzed are examined for possible recompilation, and so on, until, if necessary, all modules are compiled. Modules are only recompiled if (1) the modules they depend on have been recompiled, or (2) they were compiled with a different version of the compiler or different compiler switches than those specified in the model. If there are no errors, the modeller loads the modules by allocating memory for the global variables of each module and setting up links between modules by filling in the interface records declared in the module. When loading is completed, execution begins.

StoreBack: Models refer to files stored on central file servers accessable by users on the distributed system. The user types a file name without file server or directory information to the system editor, such as "BTreeImpl.Mesa," and the editor uses information supplied by the modeller to add location information (file server and directory) for the files. If the file name without location information is ambiguous, the user must give the entire file name to the editor. To avoid filling file servers with excess versions, the modeller does not store a new version of a source file on a file server after the source file is edited. Instead, the new versions are saved on the local disk. When the user initiates "StoreBack", all source files that have been edited are saved on designated remote directories. A new version of the model is written to its remote directory, with references to the new versions of source files it mentions.

The compiler may have produced new versions of object files for source files listed in the model. Each object file so produced is stored on the same directory as its corresponding source file.

Multiple Instances of Modellers: More than one modeller may be in use on the same machine. The user can initiate the "NewModel" button to create another window with the four subwindows or fields shown in FIG. 20 and is used in the same manner. Two instances of a modeller can even model two versions of the same system model. Since file names without locations are likely to be ambiguous in this case, the user will have to type file names and locations to the editor and do the same for the "ModelName:" field 32 in the modeller window.

Other aspects of the operation of the modeller and modeller window in FIG. 20 is described in the following sections.

II. Model Accelerators

Some models are shared among many users, who refer to them in their own models by using the @-notation and then using returned values from these shared models. An example is the model, "BasicCedar.Model," which returns a large number of commonly used interfaces (interface types) that a user might use. Although it is always possible to analyze all sub-models such as BasicCedar.Model, retrieving the files needed for analysis is very time consuming.

When the user initiates "MakeModelBcd" in field 30, the modeller makes an object file for a model, much as a compiler makes an object file for a source file. This model object file, called a .modelBcd file, is produced so that all parameters except interface records are given values, so it is a projection of the source file for the model and all non-interface record parameters. The .modelBcd file acts as an accelerator, since it is always possible to work from the sources to derive the same result as is encoded in the .modelBcd.

III. Binding Functions

The loading ability of the modeller gives the user the ability to load the object files of any valid model. This speed of loading is proportional to the size of the system being loaded and the inter-module references. As the system gets larger, it takes more time to load. However, the Cedar Binder has the ability to take the instructions and symbol table stored in each object file, merge these pieces of object, and produce an object file that contains all the information of the constituent modules while combining some tables used as runtime. This transformation resolves references from one module to another in the model, which reduces the time required to load the system and also saves space, both in the object file and when the modules are loaded. To speed loading of large systems, this feature has been preserved in the modeller. If "Bind" is initiated after "StartModel" and then "Compile" or "Begin" are initiated, an object file with instructions and symbol tables merged is produced.

The programmer may choose to produce a bound object file for a model instead of a .modelBcd file when (1) the model is very large and loading takes too long or the compression described above is effective in reducing the size of the file or (2) the object file will be input to the program that makes the boot file for the system.

IV. Module Replacement

The ability to replace a module in an already loaded system can provide faster turnaround for small program changes. Module replacement in the Cedar type system is possible if the following conditions are met:

(1). The existing global data of the module being replace may change in very restricted ways. Variables in the old global data must not change in position relative to other variables in the same file. New variables can only be added after the existing data. If the order changed, outstanding pointers to that data saved by other modules might be invalidated.

(2). Any procedures that were EXPORTed by the old version of the module must also be EXPORTed by the new version, since the address of these objects could have been passed to other modules, e.g., a procedure that is passed as a parameter.

(3). There are a number of architectural restrictions, such as the number of indices in certain tables, that must be obeyed.

(4). No procedures from the affected module can be executing or stopped as a breakpoint during the short period of time the replacement is occurring.

The modeller can easily provide module replacement since it loaded the modules initially and invokes the compiler on modules that have been changed. When the user initiates "Continue" in the field, the modeller attempts to hasten the compile-load-debug cycle by replacing modules in the system, if possible. Successful module replacement preserves the state of the system in which the replacement is performed.

The modeller calls the compiler through a procedural interface that returns a boolean true if rules (1) and (2) are obeyed; the modeller will also check to see that rules (3) and (4) are obeyed. If all four checks succeed, the modeller will change the runtime structures to use a new pointer to the instructions in the new module, which in effect replaces the old instructions by the new ones.

Some changes are substantial enough to violate rules (1)–(4), so after edits to a set of modules, some modules are replaceable and others are not. When this happens, the modules that are replaceable are replaced by new versions. The modules for which replacement failed are left undisturbed, with the old instructions still loaded. If desire, the user may try to debug those changes that were made to modules that were replaceable. If not, the user can initiate the "Begin" button to unload the current version and reload the system. Since no extra compilations are required by this approach, the user will always try module replacement if there is a possibility that it will succeed and the user wants to preverse the current state of the program or software system.

V. Debugger Interface

When the Cedar debugger examines a stopped system, e.g., at a breakpoint, the debugger can follow the procedure call stack and fine the global variables for the module in which the procedure is declared. These global variables are stored in the global frame. The modeller can provide the debugger with module-level information about the model in which this module appears, and provide file location and version information. This is particularly useful when the debugger wants to inspect the symbol table for a module, and the symbol table is stored in another file that is not on the local machine or computer disk or the user.

The programmer/user deals with the model naturally while debugging the system.

Since more than one modeller can be in use on a machine or computer, the modeller(s) call procedures in an independent runtime loader to add each model to a list of models maintained for the entire running system. When the modules of a model are loaded or unloaded, this list is updated, as appropriate. To simplify the design, the list of models is represented by the internal data structures used by the modeller to describe a model. This model has no formal parameters and no file where it is stored in text form, but it can be printed. This allows the debugger to use a simple notion of scope: a local frame is contained in the global frame of a module. This module is listed in a model, which may be part of another model that invokes it, and so on, until this topmost model is encountered. The debugger can easily enumerate the siblings in this containment tree. It can enumerate the procedures in a module, or all the other modules in this model, as appropriate. This type of enumeration occurs when the debugger tries to match the name of a module typed by the user against the set of modules that are loaded, e.g., to set the naming environment for expressions typed to the debugger.

B. Data Structures and Tables (Caches)

The procedures of the modeller can be categorized into these functional groups:

1. Procedures to parse model source files and build an internal parse tree.
2. Procedures to parse source and object files to determine needed parameterization.
3. Procedures that maintain a table, called the projection table, that expresses relationships between object files and source files, as described below.
4. Procedures that maintain a table, called the file type table, that gives information about files described in models. This includes information about the parameters needed by the file, e.g., interface types, and information about its location on the file system.
5. Procedures that load modules and maintain the top-level model used by the debugger.
6. Procedures used to call the compiler, connect the modeller to the editor, and other utility procedures.
7. Procedures to maintain version maps.

The sections below discuss essential internal data structures used in these groups, illustrations of which are shown in the tables of FIGS. 18 and 19.

I. Internal Parse Tree

The model is read in from a text file and must be processed. The modeller parses the source text and builds an internal parse tree. This parse tree has leaves reserved for information that may be computed by the modeller when compiling or loading information. When a Notice operation is given to the modeller, it alters the internal data structures to refer to new versions of files. Since new models are derived from old models when Notice operations occur, the modeller must be able to write a new copy of the model it is working on.

There is one parse tree per source model file. The links between model files that are "called" by other model files are represented as pointers from one model's internal data structure to another in virtual memory.

The internal data structure represents the dependency graph used to compile modules in correct compilation order by threading pointers from one file name to another in the parse tree.

II. Model Independent Tables

It is impractical to repeat the entire procedure just described whenever any change is made to a system. Among other things, this would imply recompiling every module. Since the entire system is applicative, however, and the value of an object never changes, the results of any computation can be saved in a cache, and reused instead of repeating the computation. In particular, the results of the type analysis of objects and the results of compilations can be saved. To this end, the modeller keeps three tables that record the results of computations that are too extensive to repeat. These tables serve as accelerators for the modeller and are stored as files on the local computer disk.

These tables are of three types and are maintained independently from instances of the modeller on a local computer disk.

The information in a table is like a cache for the modeller. It can be automatically reconstructed whenever it is not present, as the information is never purged. When the file containing the table becomes too large, the user simply deletes it from his local disk and the information is reconstructed.

Object Type Table: This table contains a list of objects that are referenced by models and have been analyzed as to their types. An example is shown in FIG. 18. The modeller abstracts essential properties of the objects in models and stores the information in this table. For example, a Cedar source file is listed along with the implied procedure type used by the modeller to compile and load it. The unique name of an object is the key in this table and its type is the value. The object type table also contains information that records whether a file has been edited, and if so, whether it has been saved on a remote file server.

Projection Table: This table keeps a list of entries that describe the results of running the compiler or other programs that takes a source object file and any needed parameters, such as interfaces, and produces a binary object file. An example is shown in FIG. 18. Before invoking, for example, the compiler on a source file to produce an object file, the modeller consults this table to see if such a file is already available. The key in this table is all the information that affects the result: the name of the source object, the names of all the parameter objects, the compiler switches, and the compiler version. The value of a table entry is the name of the binary object that results. This name is constructed from user-sensible name of the source object, plus the version stamp, the 48-bit hash code of all the other information. An entry is added to the projection table whenever the compiler is successfully run.

If an entry is not in the table, there may be an object file on the disk made by the compiler that predates the information in the projection table. If not, the compiler is invoked to produce the object file. In either case a new entry is added to the table for later use.

It is possible for these tables to fill up with obsolete information. Since they are just caches and can always be reconstructed from the sources, or from information in the .modelBinary objects, they can be purged by any convenient method, including deleting them completely. As information is needed again, it will be recomputed and reentered in the tables.

The projection table is augmented by a different kind of cache provided by the file system. Whenever the result of a needed compilation is not found in the projection table, the modeller constructs the 48-bit version stamp that the resulting binary object will have by hashing the source name and parameters, and searches for this object in the file system. If it is found, the compilation need not be redone. The result is put into the projection table so that the file system need not be searched again. This search of the file system is suppressed for source files that have just been edited, since it would never succeed in this case.

The projection table does not include the location of object files. Version maps, described below, are used for this.

Version Maps: The central file servers used by the system modeller can store more than one version of a source file in a directory. An example is shown in FIG. 19. Each version is given a version number, which ranges from 1 to 32767 and is typically less than 100. Obtaining the creation time of a source file or the 48-bit version stamp of object files from a central file server takes between ¼ and 1 second. For directories with many versions of a file, searching for the create time or version stamp can take a few seconds per file.

Since the modeller must determine the explicit version number of the file that is referenced in the model, this slow search for large numbers of files referenced by models is prohibitively excessive. To avoid this excessive searching when it is running, the modeller uses an index between create times or version stamps and full path names that include explicit version numbers for files. Since the version numbers used by the file servers are not unique and may be reused, the modeller uses this index as a cache of hints that are checked when data in the file is actually used. If there is no entry for a file in the cache, or if it is no longer valid, the versions of a file are searched and an entry is added or updated if already present. Commonly referenced files of the software system are inserted in a version map maintained on each computer or machine.

In summary, the Object Type table speeds the analysis of files, the Projection table speeds the translation of objects into derived objects, and Version Maps are used to avoid extensive directory searches.

The modeller keeps its caches on each machine or computer. It is also desirable to include this kind of precomputed information with a stored model, since a model is often moved from one computer or machine to another, and some models are shared among many users, who refer to them in their own models by using the @-notation. An example is the model CedarInterfaces.-model, which returns a large number of commonly used interfaces that a program might need. Furthermore, even with the caches, it is still quite extensive to do all the typechecking for a sizable model.

For these reasons, the modeller has the ability to create and read back compiled models. A compiled model contains (1) a tree which represents a parsed and typechecked version of the model;

(2) object type and projection tables with entries for all the objects in the model;

(3) a version map with entries for all the objects in the model.

When the user initiates the "MakeModelBcd" button in field 30 of FIG. 20, the modeller makes this binary object for the current model, much as a compiler makes a binary file from a source file. In a .modelBcd object any parameters of the model which are not instances may be given specific argument values. This is much like the binary objects produced by the compiler, in which the interface parameters are fixed. The .modelBcd objects acts merely as an accelerator, since it is always possible to work from the sources of the model and the objects it references, to derive the same result as is encoded in the .modelBcd.

III. Interaction Between Tables and .modelBcd files

As just indicated, .modelBcd file can be produced for a model that has been analyzed by initiating the "MakeModelBcd" button. The .modelBcd file contains the same information described in the previous tables. Only information relevant to the model being is analyzed is stored. The .modelBcd contains (a) a representation of the internal parse tree that results from reading and parsing the source file for the model, (b) an object type table for source files referenced by the model, (c) a projection table describing the object files are are produced, for example, by the compiler, and (d) a version map that describes, for each source and object file in (b) and (c), a file location including a version number.

A model may refer to other models in the same way it refers to other source files. The projection table includes references to .modelBcd files for these inner models.

The information stored in the model-independent tables or present in .modelBcd files is used in four different ways: three ways when the modeller is used, and once by the release process, which is described later.

StartModel Analysis: Each application of a source file to a parameter list in the model is checked for accuracy and to see if any parameters have been defaulted. The version information (create time) following the source file name is employed to look up the parameters needed by the file in the file type table. If no entry is present, the source file must be parsed to get its parameters. The version map is used to obtain an explicit file on a file server. If there is no entry for the create time of this file in a version map, all versions of the source file on the directory listed in the model are examined to see if they have the right create time. If so, an entry for that version is added to the version map and the file is read and its type is added to the object type table. If so such version can be found by enumeration, an error is reported in field 36.

If the version of the source file is given as "!H", meaning the highest version on that directory, the directory is probed for the create time of the highest version, and that create time is used as if it were given instead of "!H".

Figure 22:
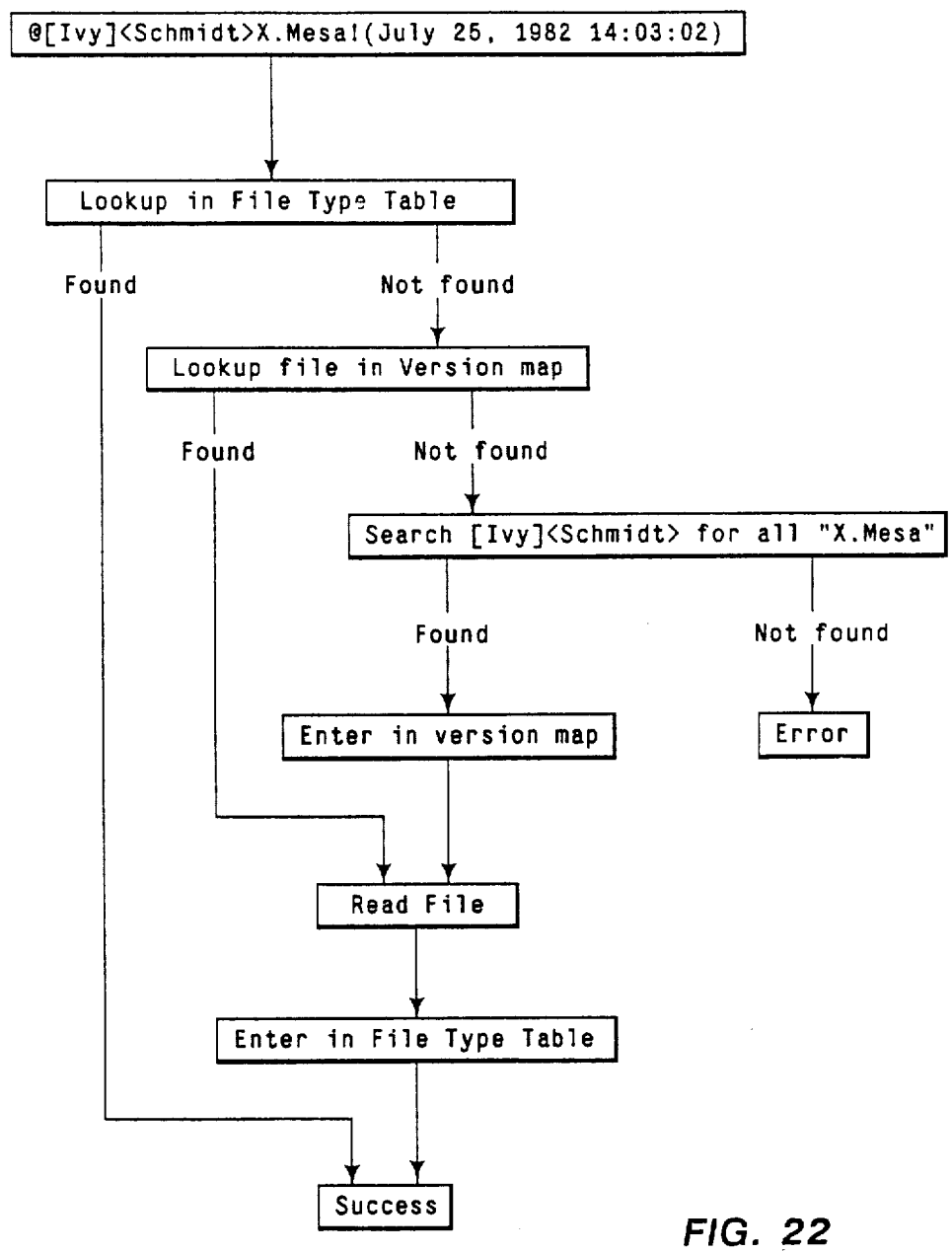
FIG. 22 is a modeller implementation flow diagram illustrating "StartModel" analysis.

FIG. 22 illustrates by flow diagram how a reference to "[Ivy]<Schmidt>X.Mesa" of July 25, 1982 14:03:02 is treated by the StartModel analysis.

Compilation Analysis: After the user initiates "Begin" or "Compile" in field 30, the modeller constructs object files for each source file in the model. Each source file and its parameters is looked up in the projection table. If not present, the modeller constructs the 48-bit version stamp that an object file would have if it had been compiled from the source and parameters given. The version map is used to search for an object file with this 48-bit version stamp. If not found in the version map, the modeller searches for an object file in the directory where the source file is stored. If found, an entry is added to the version map and to the projection table.

The modeller does not search for object files compiled from source files that have just been edited since it has knowledge that these have to be compiled.

Figure 23:
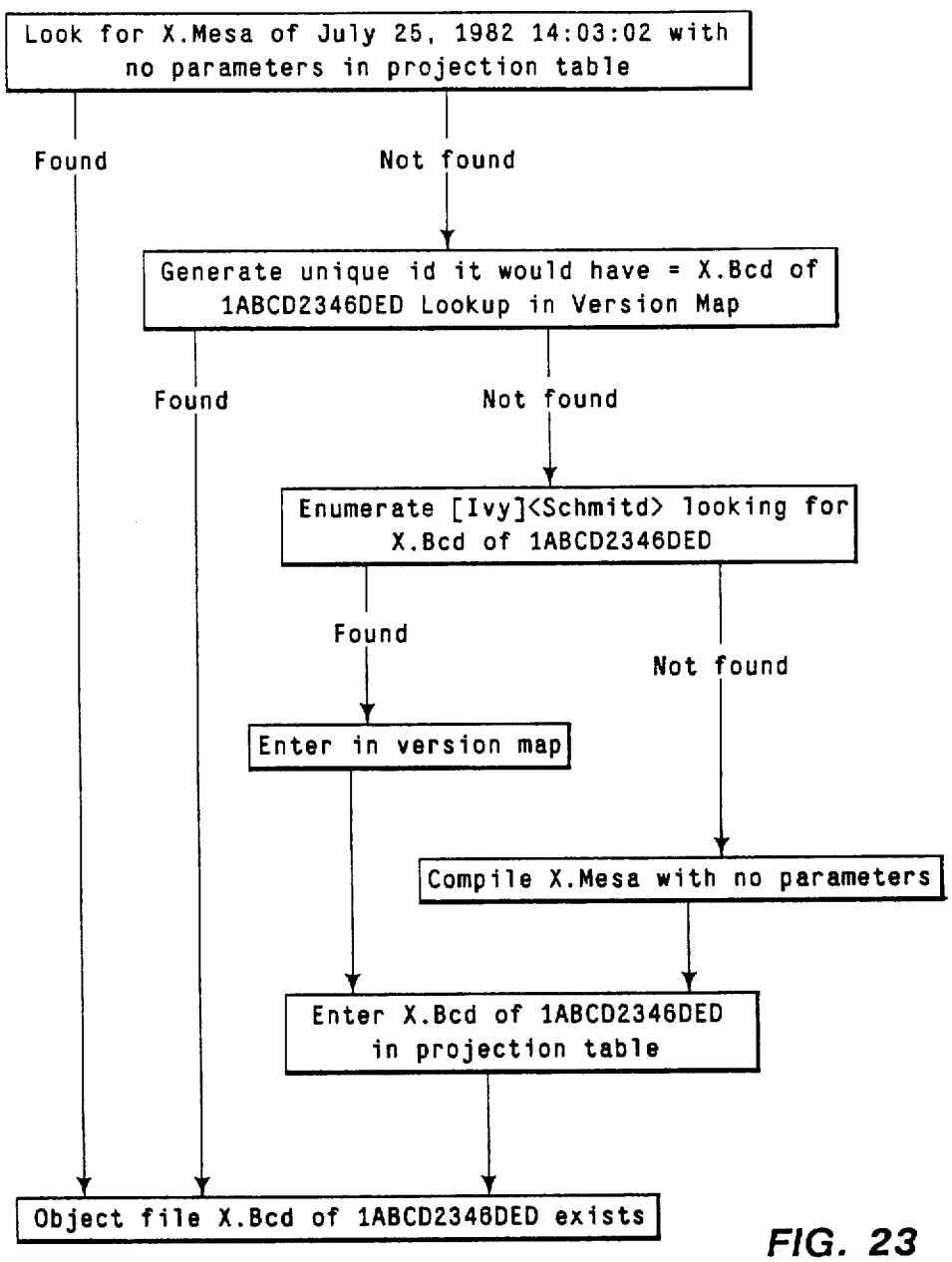
FIG. 23 is a modeller implementation flow diagram illustrating computation analysis.

If the modeller must compile a source file because it cannot find an object file previously compiled, the source file is read using the version map entry for the source and an object file produced on the local computer disk. Information about this object file is added to the model-independent tales and version maps. The object file is stored on a file server later when "StoreBack" is initiated. The compilation analysis for this is illustrated in FIG. 23.

Loader Analysis: Each object file must be read to copy the object instructions into memory. The modeller loader, as illustrated in the loading analysis of FIG. 24, looks up the 48-bit version stamp in the version map to find the explicit version of the file to read.

Since the version maps are hints, the presence of an entry for a file in a version map does not guarantee that the file is actually present on the file server and, therefore, each successful probe to the version map delays the discovery of a missing file. For example, the fact that a source file does not exist may not be discovered until the compilation phase, when the modeller tries to compile it.

IV. Retention of Information in Tables

When the modeller stores file type, projection, and version map information in .modelBcd files, it stores only information relevant to the model in use. When the modeller reads .modelBcd files, it takes the information from the .modelBcd and adds it to cache tables maintained on each machine or computer. When a module is compiled for the first time, this information is added to the tables manage centrally on each computer. This information can, over time, become obsolete and require large amounts of disk space, since these tables are stored in files on the local computer disk. If these files are deleted from the local disk, the modeller will reconstruct the information as it uses it.

C. Releases
I. General

As previously indicated, Release is a software system composed of a collection of modules which have been tested for conformance to some kind of specification, and filed so that any one of them can be retrieved simply and reliably as long as the release remains active. The Release procedure in the modeller takes a model, performs various checks on its components, builds the system it describes, and moves the system and all the components to designated directories. In more detail, Release[M]:

(1) Checks that M and each component of M is legal: syntactically correct, type-correct, and causes no compiler errors.

(2) Ensures that all objects needed by any component of M are components of M, and that only one version of each object exists (unless multiple versions are explicitly specified).

(3) Builds the system described by M.

(4) Copies all the files representing objects in M to a place where they cannot be erroneously destroyed or modified.

A release is complete if and only if every source file needed to compile every object file is among the files being released. A release is consistent if and only if only one version of each package is being released, and other packages depend only on that version. The release process is controlled by a person acting as a Release Master, who runs the modeller to verify that a proposed release is consistent and complete, and takes corrective action if it is not. Errors in models, such as references to non-existent files or references to the wrong versions of files, are detected by the Release procedure of the modeller. When errors are detected, the Release Master notifies appropriate implementor/user to correct the model.

Releases can be frequent, since performing each release imposes a low cost on the Release Master and on the environment programmers. The Release Master does not need to know any details about the packages being released, which is important when the software of the system becomes too large to be understood by any single programmer/user. The implementor/user of each package can continue to make changes until the release occurs, secure in the knowledge that the package will be verified before the release completes. Many programmers make such changes at the last minute before the release. The release process supports a high degree of parallel activity by programmers engaged in software development.

II. The Top Model

The Release Master maintains a model with one component for each component of the release. This list, called the Top model, defines, for every model named in the list, a file server and directory where it can be found. While a release is being developed, this model refers to objects on their working directories, e.g., the top model might be

```
Top ~ [
BTree ~ @[indigo]<Int>BTree.Model!H --ReleaseAs [Indigo]<Cedar>--.
Runtime ~ @[Indigo]<Int>Runtime.Model!H --ReleaseAs [Indigo]<Cedar>--
]
```

The Top model is used during the development phase as a description of models that will be in the release and gives the locations of these objects while they are being developed. The Top model provides the list of moldels that will be released. Models not mentioned in the Top model will not be released.

Every model M being released must have a LET statement at the beginning that makes the components in the Top model accessible in M. Thereafter, M must use the names from Top to refer to other models. Thus, M must begin

```
LET@[Indigo<Int>Top.Model!H IN [
...
RTypes: INTERFACE ~ Runtime,
...
]
```

Clients of a release component, e.g., RTTypes, are not allowed to refer to its model by @-reference, since there is no way to tell whether that model is part of the release. Aside from the initial reference to Top, a release component may have @-references only to subcomponents of that component.

A model M being released must also have a comment that gives its object name in the Top Model (e.g. BTree), and the working directory that has a copy of the model, e.g., —ReleaseName BTree —WorkingModelOn [Indigo]<Int>BTree.Model These comments are redundant but allow a check that Top and the component, and hence the Release Master and the implementor/user, agree about what is being released.

M must also declare the release position of each file, by appending it as a comment ater the filename in the model, e.g., @[Ivy]<Work>XImpl.Mesa!H—ReleaseAs
  [Indigo]<Cedar>XPack>—[]

A global ReleaseAs comment can define the default release position of files in the model (which may differ from the release position of the model itself). Thus if the model contains a comment, —DefaultReleaseAs [Indigo]<Cedar>BTrees>— then the user may omit the

—ReleaseAs [Indigo[<Cedar>BTrees>— clauses.

D. Modeller Implementation

The modeller must be able to analyze large collections of modules quickly, and must provide interfaces to the compiler, loader, debugger, and other programs. Described first are the basic algorithms used for evaluation and then a description of the algorithms used for releases. The cache tables used have been previously explained which gently improve performance in the normal case of incremental changes to a large software system.

I. Evaluation

In order to build a program or system, the modeller must evaluate the model for the program. As previously explained, a model is an expression written in SML notation. Evaluating an SML expression is done in three steps:

(1) The Standard $\beta$-reduction evaluation algorithm of the typed lambda calculus converts the expression into one in which all the applications are of primitive objects, namely system modules. Each such application corresponds to compilation or loading of a module. $\beta$-reduction works by simply substituting each argument for all occurrences of the corresponding parameter. SML operations such as selecting a named component of a binding are executed as part of this process. Thus, in the example, LET Instances~@CedarInstances.model IN
  Instances.Rope evaluates to @[Indigo]<Cedar>RopeImpl.cedar!(July 10, 1982,
  17:10:24)[. . .][. . .]

where the arguments of RopeImpl are filled in according to the defaulting rules.

(2) Each application of a .cedar object is evaluated by the compiler, using the interface arguments computed by (1). The result is a .binary or .Bcd object. Of course, each interface argument must itself be evaluated first; i.e., the interfaces on which a module depends must be compiled before the module itself can be compiled.

(3) Finally, each application of a .Bcd object computed in (2) is evaluated by the loader, using the instance arguments computed by (1). Cedar permits mutual recursion between procedures in different modules, so it is not always possible to fully evaluate the instance arguments. Instead, for each instance of an interface, a record is allocated with space for all the components of the interface. A pointer to the record is passed as an argument, rather than the record itself. Later, when the .binary object application which defines the interface has been evaluated by loading the object, the record is filled in with the results, namely the procedures and other values defined by that module.

Once everything has been loaded, the result is a runnable version of the program or software system.

Step (1) is done when the user initiates the StartModel screen button shown in FIG. 20 or on the affected subtree whenever the current model is modified by a Notice operation. For StartModel, the modeller reads the model from its source file, parses the source text and builds an internal parse tree. For Notice, the parse tree already exists, and is simply modified by substituting the new version for each occurrence of the old one. The leaves of this parse tree are the system modules referenced with "@" from the model. If another model is referenced, it does not become a leaf. Instead, its parse tree is computed and becomes a subtree of the containing model.

After the parse tree is built, it is evaluated to produce a value tree. The evaluation applies functions by substituting arguments for parameters in the function body, looks up names in bindings, does type checking, and supplies defaulted arguments. The first two operations have already been discussed. Typechecking requires knowing the type of every value. For a value which is a system module, the modeller obtains its type by examining the first few lines of the module, where the interfaces and instances imported by the module are declared in DIRECTORY and IMPORTS clauses, together with the instances EXPORTed in an EXPORTs clause.

For example, a module M which uses interfaces A and B, IMPORTs an instance of A, and EXPORTs an instance of B, begins

| DIRECTORY A,B; |
|---|
| M: PROGRAM<br>IMPORTS A:<br>EXPORTS B; | and has the type

[INTERFACE A, INTEFACE B]→[[A]→[B]]

i.e., it is a function taking two interface arguments and returning, after it is compiled, another function that takes an instance of A and returns an instance of B. The modeller checks that the arguments supplied in the model have thee types, and defaults them if appropriate. SML typechecking is discussed in detail in the Article of B. W. Lampson et al, "Practical Use of a Polymorphic Applicative Language", *Proceedings of the 10th Symposium on Principles of Programming Languages*, Austin, Tex., January 1983.

After the entire model has been evaluated, the modeller has determined the type of each module and has checked to determine that every module obtains the arguments of the type it wants. Any syntactic or type errors discovered are reported to the user. If there are none, then whenever a value is defined in one module and used in another, the two modules agree on its type. Nothing at this point has yet been compiled or loaded.

After step (1), the value of the model is a tree with one application for each compilation or loading operation that must be done. The compilation dependencies among the modules are expressed by the aguments: if module A is an argument to module B, then A must be compiled first, and if A changes, B must be recompiled. Because of the level of indirection in the implementation of loading, it is not necessary to reload a module when other modules change.

To get from this tree to a fully compiled program or system, each application of a source module must be evaluated by the compiler, as described in (2). During this evaluation, the compiler may find errors within the module. This step is done when the user initiates the "Compile" or "Begin" button.

After step (2), the value of the model is a tree in which each application of a source object has been replaced by the binary object that the compiler produced. To get from this tree to a runnable program or system, each binary object must be loaded, and each instance record filled in with the procedures EXPORTed from the modules that implement it. The details of how this is done are very dependent on the machine architecture and the runtime data structures of the implementing language.

E. Release Utility

After preparation of all models that are to be released, the Relase Master runs the Release Utility, Release, which makes three passes over the module being released.

I. Phase one: Check

The Check phase of Release checks the Top model and all its sub-models for problems that might prevent a successful release. Each model is parsed and all files listed in the model are checked. Check ensures that the versions listed in the models exist and that their parameterization is correct. The directory containing each source file is checked to make sure it contains a valid object file. This guards against compilation errors in the source files. Common blunders are caught, such as a reference to a model that is not in the Top model. The Release Master contacts implementors and asks for correction of errors caught in this phase.

II. Phase two: Move

The Move phase moves the files of the release onto the release directory and makes new versions of the models that refer to files on the release directory instead of the working directory. For each model listed in the release position list, Move:
 (1) reads in the model from the working directory,
 (2) moves each file explicitly mentioned in the model to its release position,
 (3) writes a new version of the source file for the model in the release directory.

This release version of the model is like the working version except that (a) all working directory paths are replaced by paths on the release directory, (b) a comment is added recording the working directory that contained the working version of the model, and (c) the LET statement referring to the Top model is changed to refer to the one on the release directory.

For example, the model may look like the following:

```
--ReleaseName BTreeModel
--CameFromModelOn [Indigo]<Int>Btree.Model
--DefaultCameFrom [Indigo]<Int>BTrees>
LET @[ivy}<Rel>ReleasePosition.Model IN [
. . .
RTTypes:
INTERFACE ~ @[Indigo]<Cedar>XPack>file.bed!1234
--CameFrom [Indigo]<Int>XPack>--,
. . .
]
```

Any references to highest version, "!H", are changed to be explicit create times as the model is written.

At the end of phase Move, the working position model is automatically converted to a release position model that defines the same variables as the working position model, but sets those variables to refer to the model stored on the release directory. A release position model might be

```
Position ~ [
BTreeModel ~ @[Indigo]<Cedar>BTree.Model!1234,
RuntimeModel ~ @[Indigo]<Cedar>Runtime,Model!]2345]
]
```

Note that the LET switch is a deviation from explicit parameterization that allows us to change the nature of each model from being a development version to being a released version. The LET switch could be avoided if every model took a parameter that controlled whether its LET statement should refer to the working position model or the release position model. The SML language could be augmented with a type "BOOLEAN" and an IF-THEN-ELSE expression to accomplish this. Because Release has to rewrite models anyway to eliminate "!H" references, the LET switch is chosen to be accomplished automatically.

Phase Move also constructs a directed graph of models in reverse dependency order that will be used in phase Build. In this dependency graph, if Model A refers to model B, then B has an edge to A.

FIG. 22 illustrates the movement of files by this phase.

III. Phase Three: Build

The Build phase takes the dependency graph computed during the move phase and uses it to traverse all the models in the release. For each model:
 (1) All models on incoming edges must have been examined.
 (2) For every source file in the model, its object file is moved to the release directory from the working directory.
 (3) A.modelBed file is made for the version on the release directory.
 (4) If a special comment in the model is given, a fully-bound object file is produced for the model, usually to use as a boot file.

After this is done for every model, a version map of the entire release is stored on the release directory.

FIG. 23 illustrates the movement of files by this phase.

At the conclusion of phases Check, Move and Build, Release has established that:

(1) Check: All reachable objects exist, and derived objects for all but the top object have been computed. This means the files input to the release are statically correct.

(2) Move: All objects are on the release directory. All references to files in these models are by explicit create time (for source files) or version stamps (for object files).

(3) Build: The system has been built and is ready for execution. All desired accelerators are made, i.e., .modelBcd files and a version map for the entire release.

IV. Phase Implementation Details

Phase Check. In order to know the parameterization of files referenced in the model, some part of each system file must be read and parsed. Because of the large number of files involved, phase Check maintains object type and projection tables and a version map for all the files on their working directories. These tables are filled by extracting the files stored in the .modelBcd files for the models being submitted to the release. Any models without .modelBcd accelerators are read last in phase Check and the result of analyzing each file is entered into the database. The version map information about object file location(s) and projection table are used later in phase Build.

Because files can be deleted by mistake after the .modelBcd file is made and before phase Check is run, Release checks that every version of every file in the release is present on the file server by verifying the file location hints from the .modelBcd files.

Phases Move and Build. The Move and Build phases could have been combined into a single phase. Separating them encourages the view that the Build phase is not logically necessary, since any programmer can build a running system using the source models and source files that are moved to the release directory during the Move phase. The Build phase makes a runnable system once for all users and stores the object files on the release directory.

The Build phase could be done incrementally, as each model is used for the first time after a release. This would be useful when a release included models that have parameters that are unbound, which requires the user to build the model when the model is used and its parameter are given values.

The Check phase file type and projection tables and version map are used to make production of the .modelBcd files faster. The projection table is used to compute the version stamps of object files needed, and the version map is used to get the file name of the object file. This object file is then copied to the release directory. The file type entry, projection entry and new release position of source and object files are recorded in the .modelBcd being built for the released model.

The Build phase has enough information to compile sources files if no suitable object files exist. To speed up releases, it is preferred that the programmer/user make valid object files before the operation of Move and Build. If such an object file is not on the same directory as the source file, the programmer/user is notified of his error and ask to prepare one. If the Release Master ran the compiler, he would most likely compile a file that the programmer had fogotten to recompile, and this file might have compilation errors in it. The ability to automatically compile every file during a release is useful in extensive bootstraps, however. For example, a conversion to a new instruction set, where every module in the release must be compiled, is easily completed using a cross-compiler during the phase Build.

The Build phase produces the version map of the release by recording the create time or version stamp of every file stored by Release on the release directory, along with file server, directory, and version number for the file. The version maps supplied by the .modelBcd files that were submitted to the release cannot be used, since they refer to files on their development directories and not on the release directories. This released version map is distributed to every machine or computer. Although the .modelBcd files also have this information, it is convenient to have allthe version information released in one map.

Figure 24:
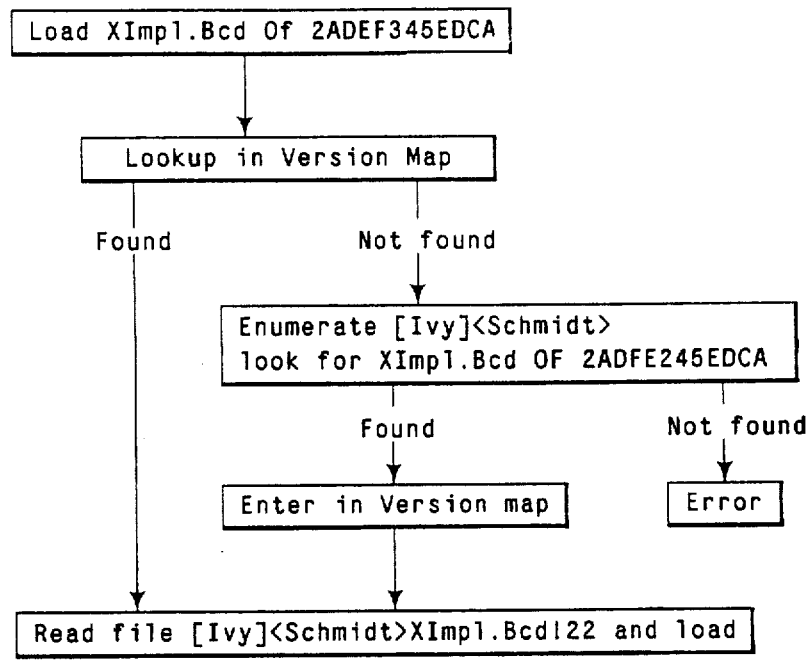
FIG. 24 is a modeller implementation flow diagram illustrating loader analysis.
Figure 25:
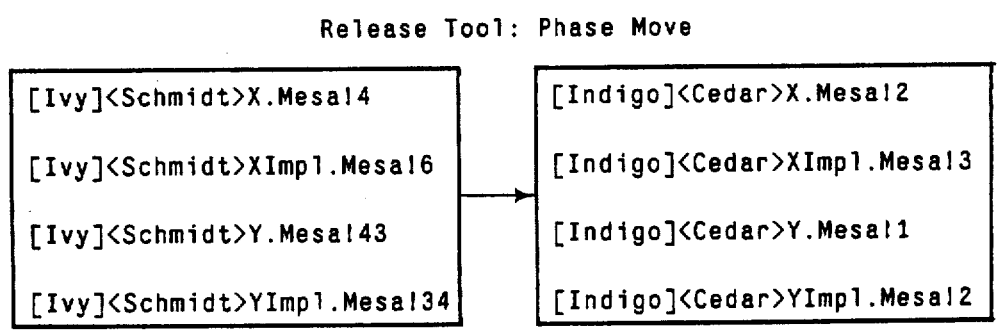
FIG. 25 illustrates the Move Phase two of the release utilitity.

FIG. 24 is an example of a single version map.

The working position model may list other nested working position models. The objects defined in the nested working position model are named by qualifying the name of the outer object. For example, if Top contained

```
Top ~ [
...
NestedSet ~ @[Indigo]<Int>NestedWPM.ModellH ~ ReleaseAs
[Indigo]<Cedar> ~
...
]
```

Then, the elements of the nested working position model can be referred to using "." notation, e.g., Top.-NestedSet.Element. The "ReleaseAs" clause in Top indicates the directory in which the analogous release position model is written. The same algorithm is used to translate the working model into a release model.

4. Summary

A model refers to objects, i.e. source files, binary (object) files or other models, by their unique names. In order to build a system from a model, however, the modeller must obtain the representations of the objects. Since objects are represented by files, the modeller must be able to deal with files. There are two aspects to this:

(1) Locating the file which represents an object, starting from the object's name.

(2) Deciding where in the file system a file should reside, and when it is no longer needed and can be deleted.

It would be desirable if an object name could simply be used as a file system name. Unfortunately, file systems do not provide the properties of uniqueness and immutability that object names and objects must have. Furthermore, most file systems require a file name to include information about the machine or computer that physically stores the file. Hence, a mapping is required from object names to the full pathnames that unambiguously locate files in the file system.

To locate a file, the modeller uses a location hint in the model. The object reference @[Ivy]<Schmidt>B-TreeImpl.cedar!(Jan. 14, 1983, 14:44:09) contains such a hint, [Ivy]<Schmidt>. To find the file, the modeller looks on the file server Ivy in the directory Schmidt for a file named BTreeImpl.cedar. There may be one or more versions of this file; they are enumerated, looking for one with a creation date of Jan. 14, 1983, 14:44:09. If such a file is found, it must be the representation of this object.

The distributed environment introduces two types of delays in access to objects represented by files: (1) If the file is on a remote machine, it has to be found. (2) Once found, it has to be retrieved.

Since retrieval time is determined by the speed of file transfer across the network and the load on the file server, the modeller tries to avoid retrieving files when the information it wants about a file can be computed once and stored in a database. For example, the type of an object, which is the information needed to compute its compilation dependencies, is small compared to the object itself. The object type table stores the types of all objects of current interest; a source object in the table does not have to be examined, or even retrieved, unless it actually needs to be recompiled.

In cases where the file must be retrieved, determining which machine or computer and directory has a copy of the version desired can be very time consuming. Even when a file location hint is present and correct, it may still be necessary to determine several versions of the file to find the one with the right creation date. The modeller minimizes these problems by keeping another cache, which maps an object name into the full path name in the distributed file system of a file which represents the object. This cache is the Version Map, discussed previously. Note that both source objects, whose unique identifiers are creation dates, and binary objects, whose unique identifiers are version stamps, appear in the version map. The full pathname includes the version number of the file, which is the number after the "!". This version number makes the file name unique in the file system so that a single reference is sufficient to obtain the file.

Thus, the modeller's strategy for minimizing the cost of referencing objects has three paths:

(1) Consult the object type table or the projection table, in the hope that the information needed about the object is recorded there. If it is, the object need not be referenced at all.

(2) Next, consult the version map. If the object is there, a single reference to the file system is usually sufficient to obtain it.

(3) If there is no entry for the object in the version map, or if there is an entry but the file it mentions does not exist, or does not actually represent the object, then use the file location hint to identify a directory, and enumerate all the versions of the file to find one which does represent the object. If this search is successful, make a new entry in the version map so that the search need not be repeated.

Like the other caches, a version map is maintained on each computer or machine and in each .modelBcd object. A .modelBcd version map has an entry for each object mentioned in the model. A machine version map has an entry for each object which has been referenced recently on that machine. In addition, commonly referenced objects of the software system are added to the machine version map as part of each release.

Since the version maps are hints, a version map entry for an object does not guarantee that the file is actually present on the file server. Therefore, each successful probe to the version map delays the discovery of a missing file. For example, the fact that source file does not exist may not be discovered until the compilation phase, when the modeller tries to compile it. This means that the modeller must be robust in the face of such errors. The release process, however, guarantees that the files are present as long as the release remains active.

While the system modeller has been described in conjunction with specific embodiments, it is evident that alternatives, modifications and variations will be apparent to those skilled in this art in light of the foregoing description. Accordingly, it is intended to embrace all such alternatives, modifications and variations as fall within the spirit and scope of the appended claims.

What is claimed is:

1. A software version management system for automatically collecting and recompiling updated versions of component software objects comprising a software program for operation on a plurality of personal computers coupled together in a distributed software environment via a local area network and wherein said objects include the source and binary files for various of said software program and are stored in various different local and remote storage means through said environment, said component software objects being periodically updated via environment editing means by various users at said personal computers and stored in designated storage means, said system including:

models comprising system objects,
  each of said models representative of the source versions of a particular component software object,
  each of said models containing object pointers including a unique name of the object, a unique identifier descriptive of the cronological updating of its current version, information as to an object's dependencies on other objects and a pathname representative of the residence storage means of the object,
  means in said editing means to notify said management system when any one of said objects is being edited by a user,
  means in said management system in response to notification of object editing to track said edited objects and alter their respective models to the current version thereof,
  said management system upon command adapted to retieve and recompile said source files corresponding to said altered models and load the binary files of said altered component software objects and their dependent objects into said computers.

2. The software version management system of claim 1 wherein said system includes accelerator means to cache said object pointers in said models that never change to thereby avoid further retrieving of said objects to parse and to discern said object pointers.

3. The software version management system of claim 2 wherein said accelerator means for said models includes
  an object type table for caching the unique name of the object and its object type to enhance the analysis of a model by said management system,
  a projection table for caching the unique name of the source object, names of object parameters, compiler switches and compiler version to enhance the translation of objects into derived objects, and
  a version map for caching said pathname.

4. A method for automatically collecting updated versions of component software modules together which comprise a software program operative on a plurality of computers, said computers coupled together in a distributed software environment via a local area network and wherein said modules are stored in various different local and remote storage means throughout said environment and comprising the steps of creating models representative of said modules, each of said models containing object pointers comprising a unique name of the module, a unique identifier descriptive of the chronological updating of its current version, information as to a module's dependencies on other modules in the software program and a pathname representative of the residence storage means where the module resides, monitoring the editor facilities of said computers to determine when a module is being edited to form an updated version thereof, altering the model to reflect said updated version upon completion of editing.

5. The method of claim 4 which includes the steps of retrieving and recompiling said modules corresponding to the models altered, and loading the recompiled modules and their dependent modules into said computers.

6. The method of claim 4 which includes the step of caching model object pointers that do not change to avoid discerning and parsing of said object pointers each time a model is altered.

* * * * *